(12) United States Patent
Ashiba et al.

(10) Patent No.: US 8,807,301 B2
(45) Date of Patent: Aug. 19, 2014

(54) FLUID PRESSURE SHOCK ABSORBER

(75) Inventors: Masahiro Ashiba, Kanagawa (JP);
Kenji Hikosaka, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 236 days.

(21) Appl. No.: 12/382,718

(22) Filed: Mar. 23, 2009

(65) Prior Publication Data

US 2009/0242341 A1      Oct. 1, 2009

(30) Foreign Application Priority Data

Mar. 26, 2008   (JP) ................................. 2008-079590
Oct. 24, 2008   (JP) ................................. 2008-274765

(51) Int. Cl.
*F16F 9/34*   (2006.01)

(52) U.S. Cl.
USPC ................................... 188/322.15

(58) Field of Classification Search
CPC ..... F16F 9/3214; F16F 9/3228; F16F 9/0227; F16F 9/3405
USPC .................. 188/322.13, 322.15, 282.5, 282.6
See application file for complete search history.

(56) References Cited

U.S. PATENT DOCUMENTS

| | | | |
|---|---|---|---|
| 5,259,294 A | | 11/1993 | May |
| 5,810,130 A | * | 9/1998 | Mc Candless ........... 188/322.22 |
| 6,247,563 B1 | * | 6/2001 | De Carbon et al. ........ 188/282.5 |
| 6,460,664 B1 | * | 10/2002 | Steed et al. .............. 188/322.15 |
| 6,991,397 B2 | * | 1/2006 | Welch .......................... 403/297 |
| 8,127,901 B1 | * | 3/2012 | Lu ............................. 188/322.15 |

FOREIGN PATENT DOCUMENTS

| | | | |
|---|---|---|---|
| EP | 0557548 | * | 9/1993 |
| JP | 48-21378 | | 6/1973 |
| JP | 3383865 | | 3/2003 |
| JP | 2005-188602 | | 7/2005 |
| JP | 2006-275216 | | 10/2006 |
| JP | 2007-198515 | | 8/2007 |

OTHER PUBLICATIONS

Japanese Office Action, with English translation, issued Aug. 7, 2012 in Japanese Patent Application No. 2008-274765.
Japanese Office Action, with English translation, issued Jan. 28, 2014 in Japanese Patent Application No. 2013-118882.

* cited by examiner

*Primary Examiner* — Vishal Sahni
(74) *Attorney, Agent, or Firm* — Wenderoth, Lind & Ponack, LLP

(57) ABSTRACT

A fluid pressure shock absorber includes a piston which is constituted by two piston bodies. An annular valve seat is formed on a non-coupled surface of one of the piston bodies, so that extension-side communication passages are located radially inside the annular valve seat and compression-side communication passages are located radially outside the annular valve seat, and an annular valve seat is formed on a non-coupled surface of the other of the piston bodies, so that the compression-side communication passages are located radially inside the annular valve seat and the extension-side communication passages are located radially outside the annular valve seat. A sliding member is disposed around one of the pitons bodies. A rotation preventing unit for preventing relative rotation of the piston bodies is provided on coupled surfaces of and of the piston bodies. A nut for fastening the piston bodies and disk valves is disposed at an end of a piston rod.

21 Claims, 9 Drawing Sheets

FLUID PRESSURE SHOCK ABSORBER

BACKGROUND OF THE INVENTION

The present invention relates to a fluid pressure shock absorber.

In some fluid pressure shock absorbers, a damping force is generated by controlling a movement of fluid caused by a movement of a piston. The piston may be constituted of two piston bodies, and passages formed at the piston bodies may be in communication with each other to form fluid passages, and a resin sliding member may be attached around the piston bodies. (For example, refer to Japanese Patent Application Public Disclosure 2005-188602.)

SUMMARY OF THE INVENTION

For a fluid pressure shock absorber, there is need to improve productivity by making manufacturing of a piston easier.

Therefore, an object of the present invention is to provide a fluid pressure shock absorber the productivity of which can be improved by making manufacturing of a piston easier.

To achieve the forgoing and other objects, one aspect of the present invention is a fluid pressure shock absorber, in which a piston comprises two piston bodies; each of the piston bodies includes a plurality of extension-side communication passages and a plurality of compression-side communication passages; an annular valve seat is formed on a non-coupled surface of one of the piston bodies so that the extension-side communication passages are located radially inside the annular valve seat and the compression-side communication passages are located radially outside the annular valve seat, and an annular valve seat is formed on a non-coupled surface of the other of the piston bodies so that the compression-side communication passages are located radially inside the annular valve seat and the extension-side communication passages are located radially outside the annular valve seat; disk valves adapted to abut against the valve seats are disposed on the non-coupled surfaces of the one and the other piston bodies; a sliding member is disposed around the one or the other of the pitons bodies; a rotation preventing unit for preventing relative rotation of the piston bodies is provided on coupled surfaces of the piston bodies; and a nut for fastening the piston bodies and the disk valves is disposed at the other end of the piston rod.

Another aspect of the present invention is a fluid pressure shock absorber, in which a piston comprises two piston bodies having coupled surfaces; a plurality of extension-side communication passages and a plurality of compression-side communication passages are provided in the piston bodies when the piston bodies are coupled with each other at one or more predetermined rotational positions; disk valves for generating damping forces are disposed on the respective surfaces of the piston; a sliding member is disposed around one of the piston bodies; a rotation preventing unit for preventing relative rotation of the piston bodies from the predetermined rotational positions is provided on the coupled surfaces of the piston bodies; and an axial force receiving portion continuously extending from one surface of the piston to the other surface of the piston and receiving a tightening axial force of the nut is formed in a through-hole through which a piston rod of the piston is inserted.

Still another aspect of the present invention is a fluid pressure shock absorber, in which a piston is constructed as a combination of two piston bodies; a plurality of extension-side communication passages and a plurality of compression-side communication passages are provided in the piston bodies when the piston bodies are coupled with each other at one or more predetermined rotational positions; a plane portion which serves as a seal surface for blocking a fluid flow when the piston bodies are coupled with each other is formed around the extension-side communication passages and the compression-side communication passages on coupled surface sides of the piston bodies; a rotation preventing unit for preventing relative rotation of the piston bodies from the predetermined rotational positions is provided on the coupled surfaces of the piston bodies; disk valves for generating damping forces are disposed on the respective surfaces of the piston; and a sliding member is disposed around one of the piston bodies.

According to the present invention, productivity of a fluid pressure shock absorber can be improved by making manufacturing of a piston easier.

BRIEF DESCRIPTION OF THE DRAWINGS

FIG. 2(a), FIG. 2(b), and FIG. 2(c) are a front view, a sectional side view, and a back view, respectively;

FIG. 3(a), FIG. 3(b), and FIG. 3(c) are a front view, a sectional side view, and a back view, respectively;

FIG. 5(a), FIG. 5(b), and FIG. 5(c) are a front view, a sectional side view, and a back view, respectively;

FIG. 6(a), FIG. 6(b), and FIG. 6(c) are a front view, a sectional side view, and a back view, respectively;

FIG. 7(a) and FIG. 7(b) are a sectional side view and a back view, respectively;

FIG. 8(a) and FIG. 8(b) are a front view and a sectional side view, respectively;

DETAILED DESCRIPTION OF THE INVENTION

First Embodiment

Hereinafter, a fluid pressure shock absorber of a first embodiment of the present invention will be described with reference to FIGS. 1 to 3.

Figure 1:
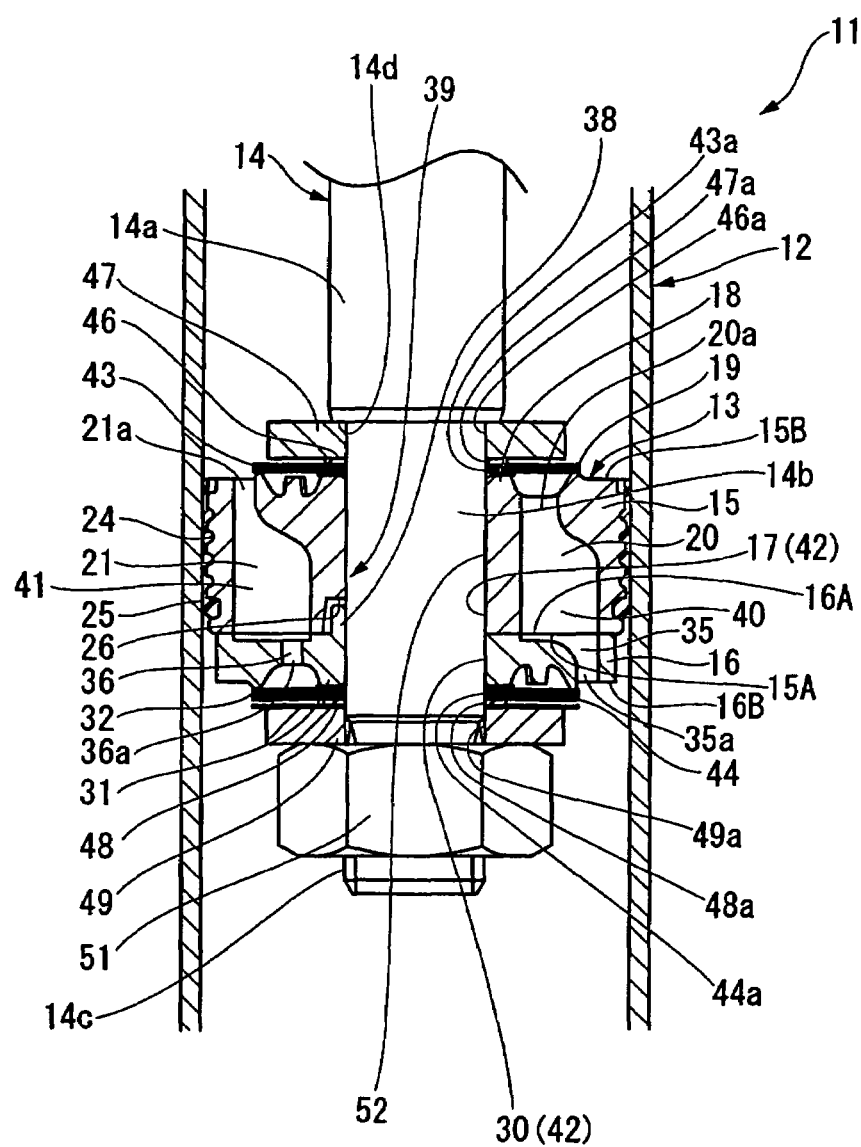
FIG. 1 is a partial cross sectional view illustrating a fluid pressure shock absorber according to a first embodiment of the present invention.

FIG. 1 is a partial cross sectional view illustrating the fluid pressure shock absorber of the first embodiment of the present invention. FIG. 2 illustrates a first piston body of the fluid pressure shock absorber of the first embodiment of the present invention. In particular, FIG. 2(*a*), FIG. 2(*b*), and FIG. 2(*c*) are a front view, a sectional side view, and a back view, respectively. FIG. 3 illustrates a second piston body of the fluid pressure shock absorber according to the first embodiment of the present invention. In particular, FIG. 3(*a*), FIG. 3(*b*), and FIG. 3(*c*) are a front view, a sectional side view, and a back view, respectively.

A fluid pressure shock absorber 11 of the first embodiment is, for example, used in a suspension apparatus of an automobile. As shown in FIG. 1 illustrating a cross-sectional view of the essential parts, the fluid pressure shock absorber 11 comprises a cylinder 12 sealingly containing a hydraulic oil which is an exemplary embodiment of fluid, a substantially disk-shaped piston 13 slidably disposed in the cylinder 12, and a piston rod 14 having one end extending to the outside of the cylinder 12 and the other end coupled with the piston 13.

On the other end side of the piston rod 14 inside the cylinder 12, the piston rod 14 includes a fitted shaft portion 14*b* having a smaller diameter than that of a shaft portion 14*a* located at an intermediate portion of the piston rod 14, and an external thread 14*c* on the opposite side of the fitted shaft portion 14*b* from the shaft portion 14*a*. The piston 13 is retained at the fitted shaft portion 14*b* of the piston rod 14.

The piston 13 comprises two disk-shaped pistons, i.e., a first piston body (piston body) 15 and a second piston body (piston body) 16, which are coaxially disposed, aligned in the axial direction, and coupled with each other. In particular, the first piston body 15 and the second piston body 16 are arranged so that a coupled surface 15A (top view, seal surface) on one side of the first piston body 15 in the axial direction is made to abut against a coupled surface 16A (top view, seal surface) on one side of the second piston body 16 in the axial direction, and a non-coupled surface 15B on the other side of the first piston 15 in the axial direction and a non-coupled surface 16B on the other side of the second piston 16 in the axial direction are oppositely oriented. Then, the first piston body 15 and the second piston body 16 are coupled with each other. The piston 13 is formed in this way. In sum, the piston 13 is constructed as a combination of the first piston body 15 and the second piston body 16.

The first piston body 15 is made of a sintered metal, and is disposed on the side of the piston 13 close to the shaft portion 14*a* of the piston rod 14 in the axial direction. The first piston body 15 includes a through-hole 17 formed through the first piston body 15 in the axial direction at the center of the piston body 15. The fitted shaft portion 14*b* of the piston rod 14 is substantially tight-fittedly inserted through the through-hole 17.

Figure 2:
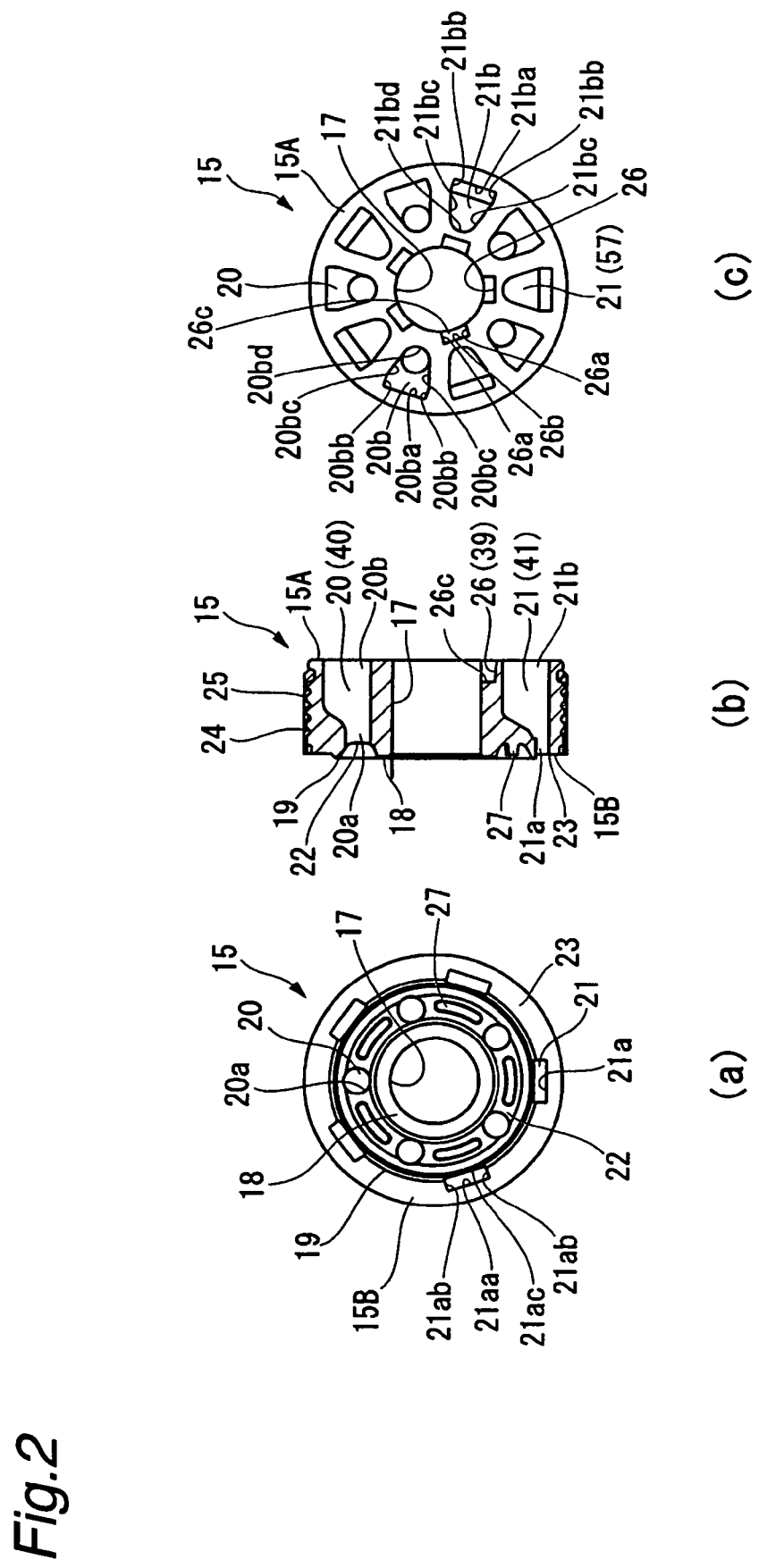
FIG. 2 illustrates a first piston body of the fluid pressure shock absorber according to the first embodiment of the present invention, and in particular.

As shown in FIG. 2, the non-coupled surface 15B, which is an opposite end surface of the first piston body 15 from the second piston body 16, includes an annular center-side protruding portion 18, and an annular outer-circumferential-side protruding portion 19. The center-side protruding portion 18 is disposed around the through-hole 17 and extends continuously along the whole circumference. The outer-circumferential-side protruding portion 19 is disposed on the radially outer end side, and extends continuously along the whole circumference. The protruding portions 18 and 19 are formed coaxially with the first piston body 15 and in a protruding manner in the axial direction. As a result, on the non-coupled surface 15B, an annular concave portion 22 is formed so as to be concaved in the axial direction continuously along the whole circumference between the center-side protruding portion 18 and the outer-circumferential-side protruding portion 19. In addition, an annular stepped portion 23 is formed so as to be concaved in the axial direction continuously along the whole circumference, and is formed radially outside the outer-circumferential-side protruding portion 19. On the other hand, the coupled surface 15A, which is an end surface of the first piston body 15 on the second piston body 16 side, is formed so as to be a substantially flat surface.

The first piston body 15 includes a plurality of first communication passages (communication passages) 20 formed through the piston body 15 in the axial direction so as to be circumferentially equiangularly located (in the present embodiment, the five communication passages 20 are formed). Each of the first communication passages 20 has an opening 20*a* at one end thereof. On the non-coupled surface 15B, which is an end surface of the first piston body 15 on the opposite side from the second piston body 16, the openings 20*a* are formed radially inside the outer-circumferential-side protruding portion 19 and radially outside the center-side protruding portion 18. That is, all of the first communication passages 20 are formed at a radially intermediate portion of the first piston body 15, and the openings 20*a* are formed at the annular concave 22.

It should be noted that all of the openings 20*a* of the first communication passages 20 are circular holes having a same flow passage cross-sectional area. Similarly, all of openings 20*b* at the other end of the first communication passages 20 have a same flow passage cross-sectional area, although the openings 20*b* have a larger flow passage cross-sectional area than that of the openings 20*a*. The first communication passages 20 each have a substantially fan shape of which narrow side is the center side of the first piston body 15. In all of the first communication passages 20, the flow passage cross-sectional areas of the openings 20*a* are the smallest flow passage cross-sectional areas in the first communication passages.

More specifically, the opening 20*b* includes a circumferentially extending linear portion 20*ba* located at an end of the opening 20*b* on the radially outer side of the first piston body 15. The opening 20*b* further includes a pair of linear portions 20*bb* extending in parallel with each other from the respective ends of the linear portion 20*ba* toward the center side of the first piston body 15. The opening 20*b* further includes a pair of inclined portions 20*bc* extending from the opposite sides of the linear portions 20*bb* from the linear portion 20*ba* so as to be closer with each other on the center side. The opening 20*b* further includes an arc portion 20*bd* connecting the opposite sides of the inclined portions 20*bc* from the linear portions 20*bb*, and formed so as to be convexly curved toward the center side of the first piston body 15.

Further, the first piston body 15 includes a plurality of second passages (passages) 21 (in the illustrated embodiment, 5 passages) axially extending therethrough so as to be circumferentially equiangularly formed so that each passage 21 is located at a middle position between the adjacent first communication passages 20. Each of the communication passages 21 has an opening 21*a* at one end thereof. On the non-coupled surface 15B, the openings 21*a* are formed radially outside the outer-circumferential-side protruding portion 19.

That is, all of the second communication passages 21 are formed at the radially intermediate portion of the first piston body 15, and the openings 21*a* are formed at the annular stepped portion 23. All of the openings 21*a* of the second communication passages 21 are rectangular holes having a same flow passage cross-sectional area. The openings 21*a* each have a rectangular shape elongated along circumference of the first piston body 15. All of openings 21*b* formed at the other end of the second communication passages 21 have a same flow passage cross-sectional area. The openings 21b each have a larger flow passage cross-sectional area than that of the openings 21a. The openings 21b of the second communication passages 21 each have a substantially fan shape of which narrow side is the center side of the first piston body 15. In all of the second communication passages 21, the flow passage cross-sectional areas of the openings 21a are the smallest flow passage cross-sectional areas in the second communication passages. As mentioned above, the first piston body 15 includes the openings 20a and the openings 21a, and the openings 20a on the inner circumferential side have circular shapes and the openings 21a on the outer circumferential side have rectangular shapes.

More specifically, the opening 21a includes a circumferentially extending linear portion 21aa located at the end of the opening 21a on the outer circumferential side of the first piston body 15. The opening 21a further includes a pair of linear portions 21ab extending in parallel with each other from the respective ends of the linear portion 21aa toward the center side of the first piston body 15. The opening 21a further includes a linear portion 21ac connecting ends of the linear portions 21ab opposite from the linear portion 21aa, and extending in parallel with the linear portion 21aa.

More specifically, the opening 21b includes a circumferentially extending linear portion 21ba located at the end of the opening 21b on the radially outer side of the first piston body 15. The opening 21b further includes a pair of linear portions 21bb extending in parallel with each other from the respective ends of the linear portion 21ba toward the center side of the first piston body 15. The opening 21b further includes a pair of inclined portions 21bc extending from the ends of the linear portions 21bb opposite from the linear portion 21ba so as to be closer with each other on the center side of the first piston body 15. The opening 21b further includes an arc portion 21bd connecting the opposite sides of the inclined portions 21bc from the linear portions 21bb, and formed so as to be convexly curved toward the center side of the first piston body 15.

An attachment portion 24 alternately having concaves and convexes in the axial direction is formed on the outer circumferential surface of the first piston body 15 having a long axial length. A resin annular piston band 25 (sliding member) such as tetrafluoroethylene band is attached to the attachment portion 24 for providing a seal between the first piston body 15 and the cylinder 12 in sliding contact with the inner circumferential surface of the cylinder 12. When the piston band 25 is attached over the attachment portion 24, the piston band 25 has a larger diameter than that of the attachment portion 24. After the attachment, heating causes radial contraction of the piston band 25, and thereby the piston band 25 to become fitted to the attachment portion 24. In sum, the piston band 25 is disposed around one of the two piston bodies, i.e., the first piston body 15.

A plurality of concave portions 26 (in the illustrated embodiment, 5 concave portions) are formed so as to be concaved in the axial direction on the through-hole 17 side of the coupled surface 15A of the first piston body 15, for circumferential positioning of the first piston body 15 at a predetermined phase relationship when the first piston body 15 is coupled with the second piston body 16. The concave portions 26 are formed so as to be aligned with the second communication passages 21 in the circumferential direction. All of the concave portions 26 have a same shape. In particular, the concave portion 26 has a substantially rectangular cross-section perpendicular to the axis line. The concave portion 26 is located on the inner circumferential side of the first piston body 15 relative to the first communication passage 20 and the second communication passage 21. The wall surface of the through-hole 17 of the first piston body 15 at portions other than the portions of the concave portions 26 continuously extends from one end of the first piston body 15, i.e., the coupled surface 15A to the other end of the first piston body 15, i.e., the non-coupled surface 15B. Further, arcuate protruding portions 27 are formed at the annular concave portion 22 on the non-coupled surface 15B of the first piston body 15. The portions 27 axially protrude from the bottom of the annular concave portion 22 in the axial direction so as to be lower than the outer-circumferential-side protruding portion 19. Each of the arcuate protruding portions 27 is located at a middle position between the circumferentially adjacent openings 20a.

More specifically, the concave portion 26 includes a pair of plane portions 26a extending in parallel with each other from the through-hole 17 toward the outer circumferential side of the first piston body 15. The concave portion 26 further includes a circumferentially extending plane portion 26b connecting the respective ends of the plane portions 26a on the opposite side from the through-hole 17. The concave portion 26 further includes a plane portion 26c perpendicular to the plane portions 26a and 26b.

The first piston body 15 is formed into the above-mentioned shape and structure by the sintering and sizing processing.

The second piston body 16 is also made from a sintered metal. As shown in FIG. 1, the second piston body 16 has a different axial length from the first piston body 15, i.e., the second piston body 16 is axially shorter than the first piston body 15. The second piston body 16 is disposed on the other side of the piston 13 in the axial direction of the piston rod 14 (the side of the piston 13 opposite from the side closer to the shaft portion 14a). The second piston body 16 includes a through-hole 30 formed through the second piston body 16 in the axial direction at the center of the piston body 16. The fitted shaft portion 14b is substantially tight-fittedly inserted through the through-hole 30.

Figure 3:
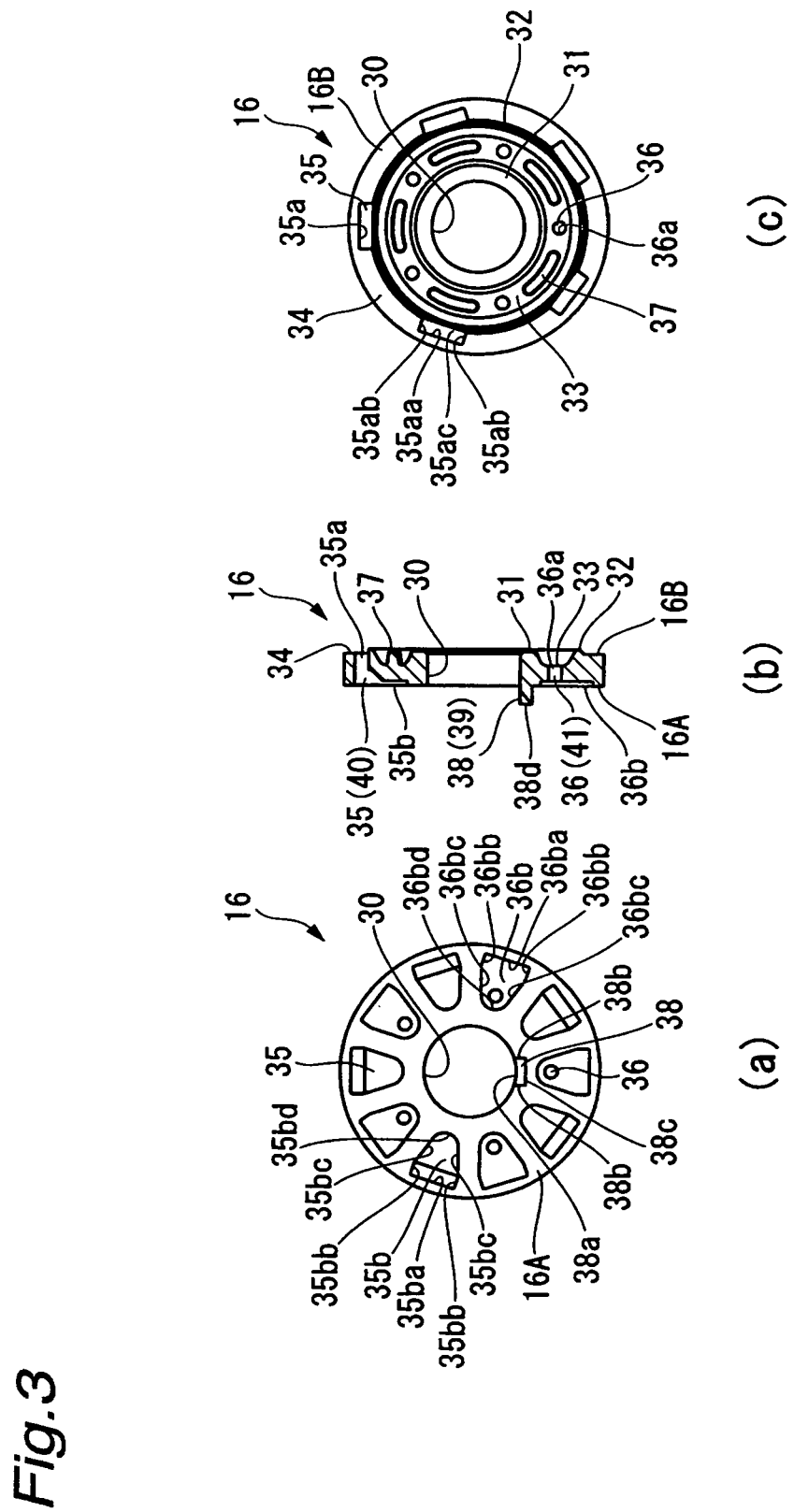
FIG. 3 illustrates a second piston body of the fluid pressure shock absorber according to the first embodiment of the present invention, and in particular.

As shown in FIG. 3, a non-coupled surface 16B, which is an opposite end surface of the second piston body 16 from the first piston body 15, includes an annular center-side protruding portion 31, and an annular outer-circumferential-side protruding portion 32. The center-side protruding portion 31 is disposed around the through-hole 30 and extends continuously along the whole circumference. The outer-circumferential-side protruding portion 32 is disposed on the radially outer side, and extends continuously along the whole circumference. The protruding portions 31 and 32 are formed coaxially with the second piston body 16 and in a protruding manner in the axial direction. As a result, an annular concave portion 33 is formed between the center-side protruding portion 31 and the outer-circumferential-side protruding portion 32 on the non-coupled surface 16B. The concave portion 33 is formed so as to be concaved in the axial direction and extend continuously along the whole circumference. In addition, an annular stepped portion 34 is formed so as to be concaved in the axial direction continuously along the whole circumference, and is formed radially outside the outer-circumferential-side protruding portion 32. On the other hand, a coupled surface 16A, which is an end surface of the second piston body 16 on the first piston body 15 side, is formed so as to be a substantially flat surface.

The second piston body 16 includes a plurality of first communication passages (communication passages) 35 (as many as the first communication passages 20) axially extending through the second piton body 16, so as to be circumferentially equiangularly located. Each of the communication passages 35 has an opening 35a at one end thereof. On the non-coupled surface 16B, which is an end surface on the side opposite from the first piston body 15, the openings 35a of the communication passages 35 are formed radially outside the outer-circumferential-side protruding portion 32. That is, all of the first communication passages 35 are formed at radially intermediate positions of the second piston body 16, and the openings 35a are formed at the annular stepped portion 34.

All the openings 35a of the first communication passages 35 are rectangular holes having a same flow passage cross-sectional area. The openings 35a each have a rectangular shape elongated along the circumference of the second piston body 16. All of openings 35b formed at the other end of the first communication passages 35 have a same flow passage cross-sectional area. The cross-sectional area of the openings 35b is larger than that of the openings 35a. The openings 35b each have a substantially fan shape of which narrow side is the center side of the second piston body 16. In all of the first communication passages 35, the cross-sectional area of the openings 35a is the smallest in the first communication passages 35. It should be noted that all of the openings 35b of the first communication passages 35 of the second piston body 16 have the same shape as the openings 20b of the first communication passages 20 of the first piston body 15, so that each opening 35b is aligned with the corresponding opening 20b when the first piston body 15 and the second piston body 16 are coupled with each other with being positioned at predetermined rotational positions. Both of the coupled surface 15A of the first piston body 15 and the coupled surface 16A of the second piston body 16 are flat surfaces, and therefore they closely contact with each other at all areas around the contact areas of the first communication passages 20 and 35, thereby serving as a seal surface for preventing leak of fluid from the contact areas of the communication passages.

More specifically, the opening 35a includes a circumferentially extending linear portion 35aa located at the end of the opening 35a on the outer circumferential side of the second piston body 16. The opening 35a further includes a pair of linear portions 35ab extending in parallel with each other from the respective ends of the linear portion 35aa toward the center side of the second piston body 16. The opening 35a further includes a linear portion 35ac connecting the ends of the linear portions 35ab opposite from the linear portion 35aa, and extending in parallel with the linear portion 35aa.

More specifically, the opening 35b includes a circumferentially extending linear portion 35ba located at an end of the opening 35b on the outer circumferential side of the second piston body 16. The opening 35b further includes a pair of linear portions 35bb extending in parallel with each other from the respective ends of the linear portion 35ba toward the center side of the second piston body 16. The opening 35b further includes a pair of inclined portions 35bc extending from the ends of the linear portions 35bb opposite from the linear portion 35ba so as to be closer to each other on the center side of the second piston body 16. The opening 35b further includes an arc portion 35bd connecting the ends of the inclined portions 35bc opposite from the linear portions 35bb and formed convexly toward the center side of the second piston body 16.

The second piston body 16 includes a plurality of second communication passages (communication passages) 36 (as many as the second communication passage 21) extending through the second piston body 16, so as to be formed circumferentially equiangularly. Each of the communication passages 36 has an opening 36a at one end thereof. The openings 36a of the communication passages 36 are formed on the non-coupled surface 16B of the second piston body 16 radially inside the outer-circumferential-side protruding portion 32 and radially outside the center-side protruding portion 31. The second communication passages 36 each are located at a middle position between the adjacent first communication passages 35. That is, all of the second communication passages 36 are formed at the radially intermediate portion of the second piston body 16, and the openings 36a are formed at the annular concave portion 33.

All of the openings 36a of the second communication passages 36 are circular holes having a same flow passage cross-sectional area. Therefore, as mentioned above, the non-coupled surface 16B includes the openings 35a and the openings 36a, and the openings 36a on the inner circumferential side are circular holes and the openings 35a on the outer circumferential side are rectangular holes. All of the openings 36b of the second communication passages 36 have a same flow passage cross-sectional area. Also, all of the openings 36b of the second communication passages 36 each have a substantially fan shape of which narrow side is the center side of the second piston body 16. The cross-sectional area of the opening 36b is larger than that of the opening 36a. In all of the second communication passages 36, the flow passage cross-sectional area of the openings 36a is the smallest in the second communication passages 36. It should be noted that all of the openings 36b of the second communication passages 36 of the second piston body 16 have the same shape as the openings 21b of the second communication passages 21 of the first piston body 15, so that the respective openings 36b are aligned with the corresponding openings 21b when the first piston body 15 and the second piston body 16 are coupled with each other while being positioned relative to each other. Both of the coupled surface 15A of the first piston body 15 and the coupled surface 16A of the second piston body 16 are flat surfaces, and therefore they closely contact with each other at all areas around the contact area of the second communication passages 21 and 36, thereby serving as a seal surface for preventing leak of fluid from the contact area of the communication passages.

More specifically, the opening 36b includes a circumferentially extending linear portion 36ba located at an end of the opening 36b on the outer circumferential side of the second piston body 16. The opening 36b further includes a pair of linear portions 36bb extending in parallel with each other from the respective ends of the linear portion 36ba toward the center side of the second piston body 16. The opening 36b further includes a pair of inclined portions 36bc extending from the opposite ends of the linear portions 36bb from the linear portion 36ba so as to be closer to each other on the center side of the second piston body 16. The opening 36b further includes an arc portion 36bd connecting the ends of the inclined portions 36bc opposite from the linear portions 36bb and formed convexly toward the center side of the second piston body 16.

No attachment portion for attaching the piston band 25 is formed on the outer circumferential surface of the second piston body 16. That is, the attachment portion 24 for attaching the piston band 25 is formed only at the axially long first piston body 15. Further, only one convex portion 38 is formed in a manner protruding in the axial direction for the purpose of positioning by being fitted into the concave portion 26 when the first piston body 15 and the second piston body 16 are coupled with each other. The convex portion 38 is located on the through-hole 30 side of the coupled surface 16A of the second piston body 16, and is aligned with one of the second communication passages 36 in the circumferential direction. The convex portion 38 has a substantially rectangular shape in cross section perpendicular to the axis line. The axial height of the convex portion 38 is less than the axial depth of the concave portion 26, and can be placed into any concave portion 26 so as to be substantially closely fitted without a gap between the concave portion 26 and the convex portion 38 in the circumferential direction (rotational direction).

More specifically, the convex portion 38 includes a curved surface portion 38a extending in the axial direction of the through-hole 30. The convex portion 38 further includes a pair of the plane portions 38b extending in parallel with each other from the respective circumferential ends of the curved surface portion 38a toward the outer circumferential side of the second piston body 16. The convex portion 38 further includes a circumferentially extending plane portion 38c connecting the ends of the plane portions 38b opposite from the curved surface portion 38a, and a top plane portion 38d at the axial top of the convex portion 38.

The first piston body 15 and the second piston body 16 are positionally fixed at predetermined rotational positions due to engagement of the concave portion 26 formed at the coupled surface 15A of the first piston body 15 and the convex portion 38 formed at the coupled surface 16A of the second piston body 16, which serves as an engagement portion (rotation preventing unit) 39 for preventing relative rotation from these positions. As mentioned above, the concave portions 26 are formed radially inside the first communication passages 20 and the second communication passages 21 in the first piston body 15, and the convex portion 38 is also formed radially inside the first communication passages 35 and the second communication passages 36 in the second piston body 16. As a result, the engagement portion 39 is formed radially inside the first communication passages 20 and 35 and the second communication passages 21 and 36 of the first piston body 15 and the second piston body 16. The wall surface of the through-hole 30 of the second piston body 16 continuously extends from one end of the second piston body 16 (i.e., the coupled surface 16A) to the other end of the second piston body 16 (i.e., the non-coupled surface 16B), along the whole circumference. Further, arcuate protruding portions 37 are formed at the annular concave portion 33 on the non-coupled surface 16B of the second piston body 16. The portions 37 axially protrude from the bottom in the axial direction so as to be lower than the outer-circumferential-side protruding portion 32. Each of the arcuate protruding portions 37 is located at a middle position between the circumferentially adjacent openings 36a.

The second piston body 16 is formed into the above-mentioned shape and structure by the sintering and sizing processing.

As mentioned above, when the first piston body 15 and the second piston body 16 are coupled with each other with the through-holes 17, 30 aligned with each other and the coupled surfaces 15A, 16A abutted against each other, the convex portion 38 is fitted into the concave portion 26 to form the engagement portion 39. That is, one of the pair of plane portions 38b of the convex portion 38 abuts against one of the pair of plane portions 26a of the concave portion 26, and the other of the pair of plane portions 38b abuts against the other of the pair of plane portions 26a. Due to this fitting, Both of the first piston body 15 and the second piston body 16 are positioned at predetermined rotational positions in the rotational direction (circumferential direction). The convex portion 38 may be fitted into any concave portion 26 so that the first piston body 15 and the second piston body 16 are circumferentially positionally fixed and relative rotation in the circumferential direction is prevented.

The convex portion 38 can be fitted into any concave portion 26 so that the openings 20b of the first communication passages 20 of the first piston body 15 and the openings 35b of the first communication passages 35 of the second piston body 16 are aligned and communicate with each other to form first fluid passages (fluid passages) 40. A plurality of first fluid passages 40 are circumferentially equiangularly formed in the piston 13 (in the illustrated embodiment, five first fluid passages 40 are formed). Similarly, the convex portion 38 can be fitted into any concave portion 26 so that the openings 21b of the second communication passages 21 of the first piston body 15 and the openings 36b of the second communication passages 36 of the second piston body 16 are aligned and communicate with each other to form second fluid passages (fluid passages) 41. A plurality of second fluid passages 41 are circumferentially equiangularly formed in the piston 13 (second fluid passages 41 as many as the first fluid passages 40 are formed).

The flow passage cross-sectional area of the first communication passage 20 which is an outer end of the first fluid passage 40 in the first piston body 15 side has a different size from that of the first communication passage 35 which is an outer end of the first fluid passage 40 in the second piston body 16 side. In particular, the opening 35a which has a smallest flow passage cross-sectional area in the first communication passage 35 is smaller than the opening 20a which has a smallest flow passage cross-sectional area in the first communication passage 20. Similarly, the flow passage cross-sectional area of the second communication passage 21 which is an outer end of the second fluid passage 41 in the first piston body 15 side has a different size from that of the second communication passage 36 which is an outer end of the second fluid passage 41 in the second piston body 16 side. In particular, the opening 36a which has a smallest flow passage cross-sectional area in the second communication passage 36 is smaller than the opening 21a which has a smallest flow passage cross-sectional area in the second communication passage 21. Therefore, the opening 35a which is the smallest portion in the first communication passages 20 and 35 constituting the first fluid passage 40, and the opening 36a which is the smallest portion in the second communication passages 21 and 36 constituting the second fluid passage 41 are both located at the second piston body 16.

Further, as shown in FIG. 1, when the first piston body 15 and the second piston body 16 are coupled with each other, a continuous single through-hole 42 is defined by the through-holes 17 and 30, and the piston 13 receives the piston rod 14 by insertion of the piston rod 14 through the through-hole 42.

A plurality of disk valves 43 for generating a damping force are stacked on the opposite side of the first piston body 15 from the second piston body 16. A plurality of disk valves 44 for generating a damping force are stacked on the opposite side of the second piston body 16 from the first piston body 15.

The disk valve 43 has a disk shape having a through-hole 43a at the center thereof. The fitted shaft portion 14b of the piston rod 14 is substantially tight-fittedly inserted through the through-hole 43a. The disk valve 43 has a size such that the disk valve 43 covers the opening 20a of the first fluid passage 40, and does not cover the opening 21a of the second fluid passage 41. The disk valve 43 opens and closes the first fluid passage 40 by moving away from and sitting on the outer-circumferential-side protruding portion 19 which serves as a valve seat of the first piston body 15.

Similarly, the disk valve 44 has a disk shape having a through-hole 44a at the center thereof. The fitted shaft portion 14b of the piston rod 14 is substantially tight-fittedly inserted through the through-hole 44a. The disk valve 44 has a size such that the disk valve 44 covers the opening 36a of the second fluid passage 41, and does not cover the opening 35a of the first fluid passage 40. The disk valve 44 opens and closes the second fluid passage 41 by moving away from and sitting on the outer-circumferential-side protruding portion 32 which serves as a valve seat of the second piston body 16.

As mentioned above, the plurality of disk valves 43 close the first fluid passages 40 consisting of the first communication passages 20 and 35 formed radially inside the outer-circumferential-side protruding portion 19 by abutting against the outer-circumferential-side protruding portion 19 as an annular valve seat formed on the non-coupled surface 15B of the first piston body 15. When the piston 13 moves toward the compression side of the fluid pressure shock absorber 11, the disk valves 43 are elastically deformed due to a differential pressure, and then move away from the outer-circumferential-side protruding portion 19 to open the plurality of compression-side first fluid passages 40, which consist of the first communication passages 20 and 35. It should be noted that the plurality of disk valves 43 constantly open the second fluid passage 41 formed radially outside the outer-circumferential-side protruding portion 19.

On the other hand, as mentioned above, the plurality of disk valves 44 close the second fluid passages 41 consisting of the second communication passages 21 and 36 formed radially inside the outer-circumferential-side protruding portion 32 by abutting against the outer-circumferential-side protruding portion 32 as an annular valve seat formed on the non-coupled surface 16B of the second piston body 16. When the piston 13 moves toward the extension side of the fluid pressure shock absorber 11, the disk valves 44 are elastically deformed due to a differential pressure, and then move away from the outer-circumferential-side protruding portion 32 to open the plurality of extension-side second fluid passages 41, which consist of the second communication passages 21 and 36. It should be noted that the plurality of disk valves 44 constantly open the first fluid passages 40 formed radially outside the outer-circumferential-side protruding portion 32.

A spacer 46 having a smaller diameter than that of the disk valve 43 is disposed on the opposite side of the plurality of disk valves 43 from the piston 13. A stopper 47 having a larger diameter than that of the spacer 46 is disposed on the opposite side of the spacer 46 from the piston 13. The spacer 46 has a disk shape with a through-hole 46a formed at the center thereof. The fitted shaft portion 14b of the piston rod 14 is substantially tight-fittedly inserted through the through-hole 46a. The stopper 47 also has a disk shape with a through-hole 47a formed at the center thereof. The fitted shaft portion 14b of the piston rod 14 is substantially tight-fittedly inserted through the through-hole 47a. The stopper 47 abuts against the opposite side of the disk valve 43 to be elastically deformed from the piston 13, and thereby limits deformation of the disk valve 43 more than that. Similarly, a spacer 48 is disposed on the opposite side of the plurality of disk valves 44 from the piston 13. A stopper 49 is disposed outside the spacer 48. The spacer 48 also has a disk shape with a through-hole 48a formed at the center thereof. The fitted shaft portion 14b of the piston rod 14 is substantially tight-fittedly inserted through the through-hole 48a. The stopper 49 also has a disk shape with a through-hole 49a formed at the center thereof. The fitted shaft portion 14b of the piston rod 14 is substantially tight-fittedly inserted through the through-hole 49a.

The fitted shaft portion 14b of the piston rod 14 is inserted through the stopper 47 which is one of the stoppers, the spacer 46 which is one of the spacers, the disk valve 43 which is one of the disk valves, the piston body 15 which is one of the piston bodies, the piston body 16 which is the other of the piston bodies, the disk valve 44 which is the other of the disk valves, the spacer 48 which is the other of the spacers, and the stopper 49 which is the other of the stoppers, and then a nut 51 is screwed to the external thread 14c protruding outside the other stopper i.e., the stopper 49. By this configuration, the stoppers 47 and 49, the spacers 46 and 48, the disk valves 43 and 44 on the respective sides, and the piston 13 are sandwiched by a stepped portion 14d of the shaft portion 14a of the piston rod 14 on the fitted shaft portion 14 side, and the nut 51, and thereby they are fastened to the piston rod 14. At this time, the piston 13 is oriented so that the first piston body 15 is disposed on the stepped portion 14d side of the shaft portion 14a and the second piston body 16 is disposed on the nut 51 side.

The two piston bodies 15 and 16 are coupled with each other, by fastening the two piston bodies 15 and 16 to the piston rod 14 with the nut 51. In other words, the nut 51 is disposed on the end of the piston rod 14 for fastening the two piston bodies 15, 16 and the disk valves 43, 44, and the piston 13 is inserted onto the piston rod 14 and fastened by the nut 51. While the piston 13 is disposed around the piston rod 14, the disk valves 43 and 44 for generating damping forces are disposed on the axial respective surfaces of the piston 13.

The plurality of the concave portions 26 are formed on the inner surface of the through-hole 17 of the first piston body 15 which constitutes a contact surface between the piston rod 14 and the piston body 15. The radially concaved concave portions 26 are formed so that the concave portions 26 are axially aligned with each other and that the concavity becomes discontinuous along the circumferential direction. On the other hand, no radially concaved concave portion is formed on the inner surface of the through-hole 30 of the second piston body 16 which constitutes a contact surface between the piston rod 14 and the piston body 16. Therefore, in the through-hole 42 of the piston 13 through which the piston rod 14 is inserted, an axial force receiving portion 52, which continuously extends from one of the end surfaces of the piston 13 (i.e., the non-coupled surface 15B) to the other of the end surfaces of the piston 13 (i.e., the non-coupled surface 16B) along the whole axial length of the through-hole 42, is formed for receiving a tightening axial force of the nut 51, except for the circumferentially arranged concave portions 26.

In the above-mentioned Conventional Art 1 disclosed in Japanese Patent Public Disclosure No. 2005-188602, when the piston is manufactured, an attachment portion is formed around the two piston bodies, covering both of the two piston bodies. Then, a sliding member is attached around the attachment portion. Therefore, in order to avoid misalignment of the piston bodies when the attachment portion is processed, it is required to joint and integrate the two piston bodies by the press-fitting process, whereby steps related to the press-fitting process should be additionally performed and therefore a problem arises such that cost for manufacturing is increased. That is, since a piston band is attached so as to extend over the two piston bodies, the sizing process is required after the press-fitting process. More specifically, required processes in the conventional art comprises manufacturing two piston bodies by sintering, performing the sizing processes on the two piston bodies, integrating the two piston bodies by press-fitting, performing again the sizing process on the integrated piston body, and attaching a piston band to the piston body.

Further, as another conventional art (Conventional Art 2), there is an invention disclosed in U.S. Pat. No. 5,259,294. In this conventional art, the piston is constructed by press-fitting a convex piston body into a concave piston body. Therefore, again, steps related to the press-fitting process should be additionally performed and therefore a problem arises such that cost for manufacturing is increased. In addition, in the conventional art, the concave piston body includes a compression-side communication passage and an extension-side communication passage, but the convex piston body includes only an extension-side communication passage, and a compression-side communication passage is formed between the convex piston body and the concave piston body. In addition, in the conventional art, only one of the two piston bodies (the convex piston body) contacts the piston rod, and the other of the piston bodies (the concave piston body) contacts the outer surface of the convex piston body, but not the piston rod. Therefore, this structure is possible by the press-fitting, but if this piston is constructed by using a tightened nut, an axial force cannot be generated.

Further, as still another conventional art (Conventional Art 3), there is an invention disclosed in Japanese Patent No. 3383865. In the conventional art, the piston is constructed of three members. However, substantive piston is only the piston 15, and the valve seat members 26 and 27 disposed so as to sandwich the piston 15 therebetween are actually adapter members disposed to increase the size of the disk. The adapter members include only either one of the compression side communication passage and the extension-side communication passage, and annular communication passages are formed between the outer circumference surfaces of the adapter members and the cylinder. In the conventional art, since the piston is constructed of the three members, the number of components is increased. In addition, in the piston constructed of the three members, there is no surface extending from one side to the other side of the piston in the hole through which the piston rod is inserted, whereby a nut tightening axial force cannot be received.

On the other hand, according to the first embodiment of the present invention, since the sliding member 25 is disposed around one or the other of the piston bodies (the piston body 15), there is no need for press-fitting the two piston bodies to join them, unlike Conventional Arts 1 and 2. While relative rotation of the piston bodies 15 and 16 are prevented by the rotation preventing unit 39 on the coupled surfaces 15A and 16A of the piston bodies 15 and 16, the piston bodies 15 and 16 and the disk valves 43 and 44 are fastened to the end of the piston rod 14 by the nut 51. Therefore, it is possible to reduce the required processes and therefore cut manufacturing cost down, and improve productivity since it becomes easier to manufacture the piston 13.

More specifically, the two piston bodies 15 and 16 are made by sintering. Then, sizing processing is performed on each of the piston bodies 15 and 16, and the sliding member 25 is attached to one of the piston bodies (the piston body 15). After that, the piston bodies 15 and 16 are disposed so as to prevent relative rotation of the piston bodies 15 and 16 by the rotation preventing unit 39, and the piston bodies 15 and 16 and disk valves 43 and 44 are fastened to the end of the piston rod 14 by the nut 51. In this way, the piston 13 can be manufactured with reduced number of processes, and accordingly, manufacturing cost can be reduced.

The piston 13 is constructed of the two piston bodies 15 and 16 including the plurality of compression-side communication passages 20, 35 and the plurality of extension-side communication passages 21, 36. In other words, the piston 13 is constructed of the two piston bodies 15 and 16 including the coupled surfaces 15A and 15B. In still other words, the piston 13 is constructed as a combination of the piston bodies 15 and 16, whereby the required components can be reduced, compared to Conventional Art 3 in which the piston is constructed of the three piston bodies.

Further, according to the first embodiment of the first embodiment, the axial force receiving unit 52 defined by the surface continuously extending from one end of the piston 13 (i.e., the surface 15B) to the other end of the piston 13 (i.e., the surface 16B) and adapted to receive a tightening axial force of the nut 51 is provided in the through-hole 42 of the piston 13 through which the piston rod 14 is inserted. In other words, the axial force receiving unit 52 is formed on the contact surface of the two piston bodies 15, 16 to contact with the piston rod 14 along the whole axial dimension. Therefore, the piston 13 can effectively receive a tightening axial force of the nut 51, compared to Conventional Arts 2 and 3. As a result, the diameters of the nut 51 and the piston rod 14 can be reduced.

Furthermore, according to the first embodiment, the plane portions 15A and 16A serving as a seal surface for blocking a fluid flow when the piston bodies 15 and 16 are coupled with each other are formed on the portions of the coupled surfaces 15A and 16A of the piston bodies 15 and 16 around the compression-side communication passages 20 and 35 and the extension-side communication passages 21 and 36. In other words, since the coupled surfaces 15A and 16A of the two piston bodies 15 and 16 are substantially flat surface, the compression-side communication passages 20 and 35, and the extension-side communication passages 21 and 36 can be appropriately defined even though the piston 13 is constructed of the two piston bodies 15 and 16.

Furthermore, since the rotation preventing unit is realized by the engagement portion 39 comprising the concave portion 26 and the convex portion 38 formed on the coupled surfaces 15A and 16A of the two piston bodies 15 and 16, relative rotation of the two piston bodies 15 and 16 from predetermined rotational positions can be securely prevented by a simple structure.

Furthermore, the engagement portion 39 is provided radially inside the communication passages 20, 35 and the communication passages 21, 36. Therefore, the torque of relative rotation applied to the engagement portion 39 is decreased, and thereby the size of the engagement portion 39 can be reduced.

Furthermore, the two piston bodies 15 and 16 have different axial lengths, and therefore can be easily distinguished. Therefore, they can be easily managed.

Furthermore, since the sliding member 25 is attached on the piston body 15 having a longer axial length, the axial length of the sliding member 25 can be sufficiently long. Therefore, the seal performance of the piston 13 on the outer circumference side can be improved, and tilt or fall down of the piston 13 can be prevented.

Furthermore, since opening ends of the communication passages 20, 21, 35 and 36 have circular shapes on the inner circumferential side and rectangular shapes on the outer circumferential side, the outer-circumferential-side protruding portions 19 and 32 as valve seats between the circular openings and the rectangular openings can have large outer diameters. Therefore, the disk valves 43 and 44 can have large outer diameters, and therefore setting of the valve-opening characteristics can become more flexible.

Furthermore, it is possible to share a mold for sintering, since the smallest area portion 35a of the compression-side communication passages 20 and 35 and the smallest area portion 36a of the extension-side communication passages 21 and 36 are provided at one of the two piston bodies 15 and 16 (i.e., the piston body 16). That is, only one of the piston bodies 15 and 16 (the piston body 16) includes the smallest area portion 36a of the extension-side communication passages 21 and 36 and the smallest area portion 35a of the compression-side communication passages 20 and 35 which are orifices determining a damping force. Therefore, the other of the piston bodies (i.e., the piston body 15) can be reused for another piston having another characteristic. In vehicles, characteristics are often quickly changed due to, for example, a minor change. Therefore, sharing even only a part of molds provides considerable merits such as a reduction in manufacturing cost.

For example, in order to create 10 kinds of pistons having 10 different damping characteristics, only 11 molds are needed. In particular, 10 molds for the second piston bodies 16 having the smallest area portions 35a, 36a at both compression and extension communication passages 35, 36, and one mold for the first piston body 15, which may be combined to any of the 10 different second piston bodies 16. On the other hand, if the smallest area portions are provided in both piston bodies 15, 16, then the required number of molds will be 20, 10 each for the first and second piston bodies 15, 16. Accordingly, with X kinds of characteristics, it is possible to reduce the number of molds by 2X−(X+1).

Having described the first embodiment of the present invention in detail, now advantageous effects of the first embodiment will be described.

According to the first embodiment of the present invention, the piston 13 is constructed of the two piston bodies, the first piston body 15 and the second piston body 16, and the piston band 25 for providing a seal between the cylinder 12 and the piston 13 is attached to only the first piston body 15. Therefore, it is not required to integrate the two piston bodies by the press-fitting process. That is, firstly, the first piston body 15 is made by the sintering and sizing processes, and the second body 16 is made by the sintering and sizing processes. The piston band 25 is attached to the first piston body 15. Then, the fitted shaft portion 14b of the piton rod 14 is inserted through the stopper 47, the spacer 46, the disk valves 43, the first piston body 15, the second body 16, the disk valves 44, the spacer 48, and the stopper 49, and the nut 51 is screwed to the external thread 14c. By this configuration, the stoppers 47 and 49, the spacers 46 and 48, the disk valves 43 and 44, and the piston 13 are sandwiched by the stepped portion 14d on the fitted shaft portion 14b side of the shaft portion 14a of the piston rod 14, and the nut 51; and then are fastened to the piston rod 14. At this time, the engagement portion 39 is formed by engagement of the concave portion 26 formed on the coupled surface 15A of the first piston body 15 and the convex portion 38 formed on the coupled surface 16A of the second piston body 16, so that the first piston body 15 and the second piston body 16 are positionally fixed at the predetermined rotational positions and relative rotation from these positions is prevented, while the first fluid passage 40 and the second fluid passage 41 are defined. Therefore, the process of press-fitting the two piston bodies and the sizing process after the press-fitting process are not required, whereby the number of processes can be reduced, manufacturing cost can be cut down, and productivity can be improved.

Further, at the first piston body 15, the plurality of compression-side first communication passages 20 and the plurality of extension-side second communication passages 21 are respectively formed only at the radially intermediate portion of the first piston body 15. Similarly, at the second piston body 16, the plurality of compression-side first communication passages 35 and the plurality of extension-side second communication passages 36 are respectively formed only at the radially intermediate portion of the second piston body 16. Therefore, it is not required to form communication passages on the outer circumferential sides of the first piston body 15 and the second piston body 16.

Furthermore, the piston 13 is constructed of only the two piston bodies, i.e., the first piston body 15 including the plurality of compression-side first communication passages 20 and the plurality of extension-side communication passages 21, and the second piston body 16 including the plurality of compression-side first communication passages 35 and the plurality of extension-side communication passages 36. In other words, the piston 13 is constructed of the first piston body 15 including the coupled surface 15A and the second piston body 16 including the coupled surface 16A. In still other words, the piston 13 is constructed as a combination of only the two piston bodies, i.e., the first piston body 15 and the second piston body 16. Therefore, the number of required components can be reduced, compared to the piston constructed of three piston bodies.

Furthermore, the axial force receiving portion 52 continuously extending from one of the end surfaces of the piston 13 (the non-coupled surface 15B) to the other of the end surfaces of the piston 13 (the non-coupled surface 16B), and receiving a tightening axial force of the nut 51 is formed in the through-hole 42 of the piston 13 through which the piston rod 14 is inserted. In other words, the axial force receiving portion 52 is formed along the whole axial length of the inner surface of the through-hole 42 that is a contact surface of the two piston bodies (the first piston body 15 and the second piston body 16) contacting with the piston rod 14. Therefore, the piston 13 can efficiently receive a tightening axial force of the nut 51, and thereby the nut 51 and the piston rod 14 can have small diameters.

Furthermore, the coupled surface 15A, which serves as a seal surface preventing fluid leak along the whole circumference when the piston bodies 15 and 16 are coupled with each other, is formed around the compression-side first communication passages 20 and the extension-side second communication passages 21 on the coupled surface 15A side of the first piston body 15. The coupled surface 16A, which serves as a seal surface preventing fluid leak along the whole circumference when the piston bodies 15 and 16 are coupled with each other, is formed around the compression-side first communication passages 35 and the extension-side second communication passages 36 on the coupled surface 16A side of the second piston body 16. In other words, since the coupled surface 15A of the first piston body 15 and the coupled surface 16A of the second piston body 16 are substantially flat planes, the compression-side first communication passages 20 and 35 and the extension-side second communication passages 21 and 36 can be well defined (and sealed) against one another, even though the piston 13 is constructed of the two piston bodies, i.e., the first piston body 15 and the second piston body 16.

Furthermore, when the first piston body 15 and the second piston body 16 are coupled with each other, the engagement portion 39 is formed by the concave portion 26 formed on the coupled surface 15A of the first piston body 15 and the convex portion 38 formed on the coupled surface 16A of the second piston body 16; and, due to the abutment of the pair of plane portions 38b of the convex portion 38 against the pair of plane portions 26a of the concave portion 26, the first piston body 15 and the second piston body 16 are aligned to each other and relative rotation of the first piston body 15 and the second piston body 16 are prevented. Therefore, positioning of the first piston body 15 and the second piston body 16 at predetermined rotational positions and prevention of relative rotation of the first piston body 15 and the second piston body 16 can be securely achieved by a simple structure.

Furthermore, the concave portion 26 of the first piston body 15 and the convex portion 38 of the second piston body 16 constituting the engagement portion 39 are formed on the inner circumferential sides of the first piston body 15 and the second piston body 16 relative to the all of the compression-side first communication passages 20 and 35 and the all of the extension-side second communication passages 21 and 36. Therefore, the torque of relative rotation of the first piston body 15 and the second piston body 16 applied to the engagement portion 39 is decreased, whereby the engagement portion 39 consisting of the concave portion 26 and the convex portion 38 can have a small diameter.

Furthermore, the piston body 15 has a long axial length and the second piston body 16 has a short axial length, and therefore they can be easily distinguished. Therefore, they can be easily managed.

Furthermore, since the piston band 25 is attached to the first piston body 15 having a long axial length, the axial length of the piston band 25 can be sufficiently long. Therefore, the seal performance of the piston 13 on the outer circumference side thereof can be improved, and tilt or fall of the piston 13 can be prevented.

Furthermore, the shapes of the opening ends of the communication passages 20, 21, 35 and 36 are advantageous. The openings 20a of the first communication passages 20 and the openings 36a of the second communication passages 36, which are both located on the inner circumferential side, have circular shapes. The openings 21a of the second communication passages 21 and the openings 35a of the first communication passages 35, which are both located on the outer circumferential side, have circumferentially long rectangular shapes. Therefore, the openings 21a and the openings 35a on the outer circumferential side can have radially short dimensions, and thereby the outer-circumferential-side protruding portions 19 and 32 as valve seats between the circular openings and the rectangular openings can have large outer diameters. Therefore, the disk valves 43, which open and close by moving away from and sitting on the outer-circumferential-side protruding portion 19, and the disk valves 44, which open and close by moving away from and sitting on the outer-circumferential-side protruding portion 32, can have large outer diameters, respectively. Accordingly, setting of the valve-opening characteristics of the disk valves 43 and 44 can be more flexible.

Furthermore, it is possible to share a mold for sintering, since the openings 35a which have the smallest area in the compression-side first fluid passages 40, and the openings 36a which have the smallest area in the extension-side second fluid passages 41 are provided only at one of the two piston bodies 15 and 16, i.e., at the piston body 16. That is, out of the piston bodies 15 and 16, only the second piston body 16 includes the openings 35a of the compression-side first fluid passages 40 and the openings 36a of the extension-side second fluid passages 41 which are orifices determining a damping force. Therefore, the other of the piston bodies, i.e., the first piston body 15, can be reused for another piston having another characteristic. In vehicles, characteristics are often quickly changed due to, for example, a minor change. Therefore, sharing even only a part of molds provides considerable merits such as a reduction in cost for manufacturing molds.

In particular, with X kinds of characteristics, it is possible to reduce the number of molds by 2X−(X+1). In other words, in the first piston body 15 and the second piston body 16, the first communication passages 20 and 35 have different flow passage cross-sectional areas at the ends of the first fluid passage 40, and the second communication passages 21 and 36 have different flow passage cross-sectional areas at the ends of the second fluid passage 41. Therefore, for example, if several kinds of the piston body 16 having different flow passage cross-sectional areas are prepared as the second piston body 16 including the first communication passage 35 and the second communication passage 36 which have small flow passage cross-sectional areas, it is possible to change the damping force characteristic just by setting a different second piston body 16 to the same first piston body 15 including the first communication passage 20 and the second communication passage 21 which have large flow passage cross-sectional areas. That is, it is possible to change the compression-side damping force characteristic by combining the second piston body 16 including the first communication passage 35 with a small or large flow passage cross-sectional area to the shared first piston body 15. Similarly, it is possible to change the extension-side damping force characteristic by combining the second piston body 16 including the second communication passage 36 with a small or large flow passage cross-sectional area to the shared first piston body 15.

Second Embodiment

Hereinafter, a fluid pressure shock absorber according to a second embodiment of the present invention will be described with reference to FIGS. 4 to 6. In particular, difference from the first embodiment will be explained in detail. In the following description, like components are denoted by like reference numerals as of the first embodiment.

Figure 4:
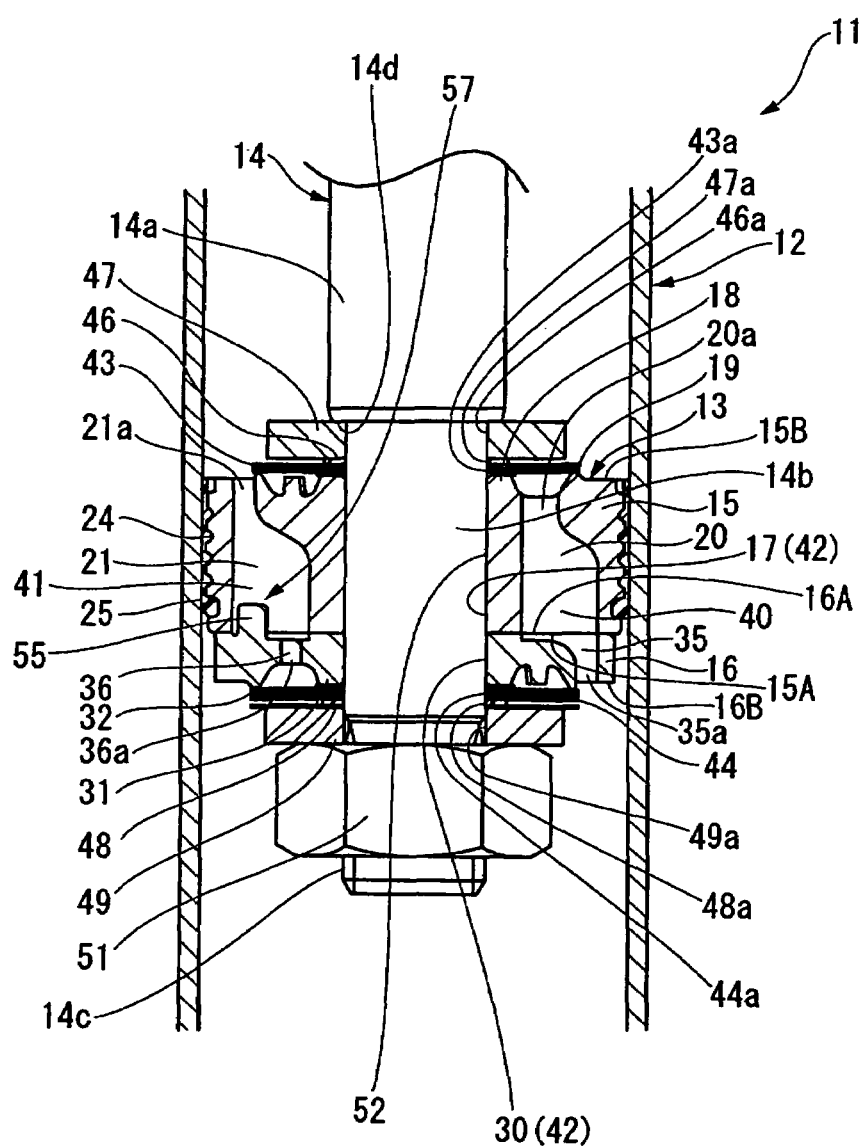
FIG. 4 is a partial cross sectional view illustrating a fluid pressure shock absorber according to a second embodiment of the present invention.

FIG. 4 is a partial cross sectional view illustrating the fluid pressure shock absorber according to the second embodiment of the present invention. FIG. 5 illustrates the first piston body of the fluid pressure shock absorber according to the second embodiment of the present invention. In particular, FIG. 5(a), FIG. 5(b), and FIG. 5(c) are a front view, a sectional side view, and a back view, respectively. FIG. 6 illustrates the second piston body of the fluid pressure shock absorber according to the second embodiment of the present invention. In particular, FIG. 6(a), FIG. 6(b), and FIG. 6(c) are a front view, a sectional side view, and a back view, respectively.

Figure 5:
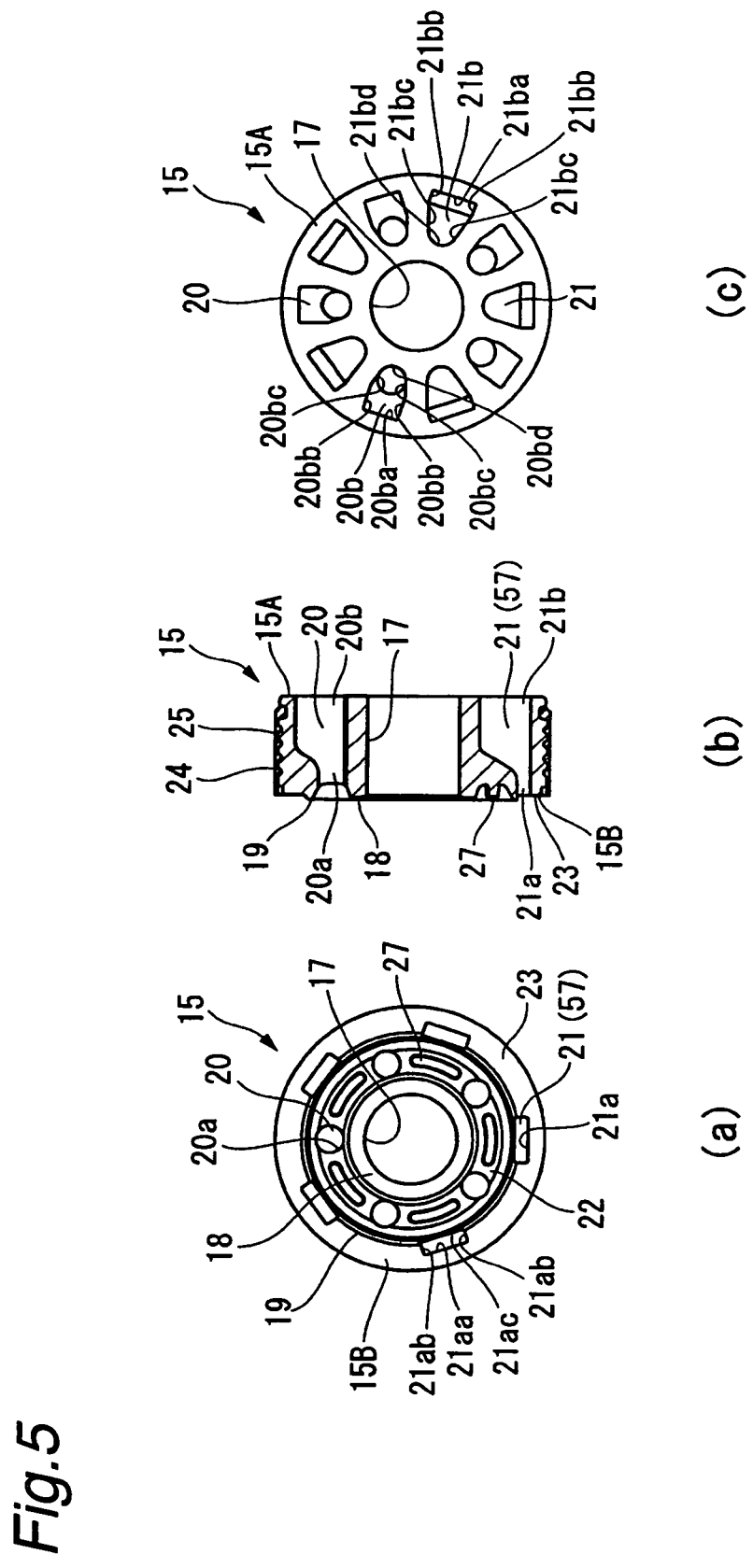
FIG. 5 illustrates a first piston body of the fluid pressure shock absorber according to the second embodiment of the present invention, and in particular.
Figure 6:
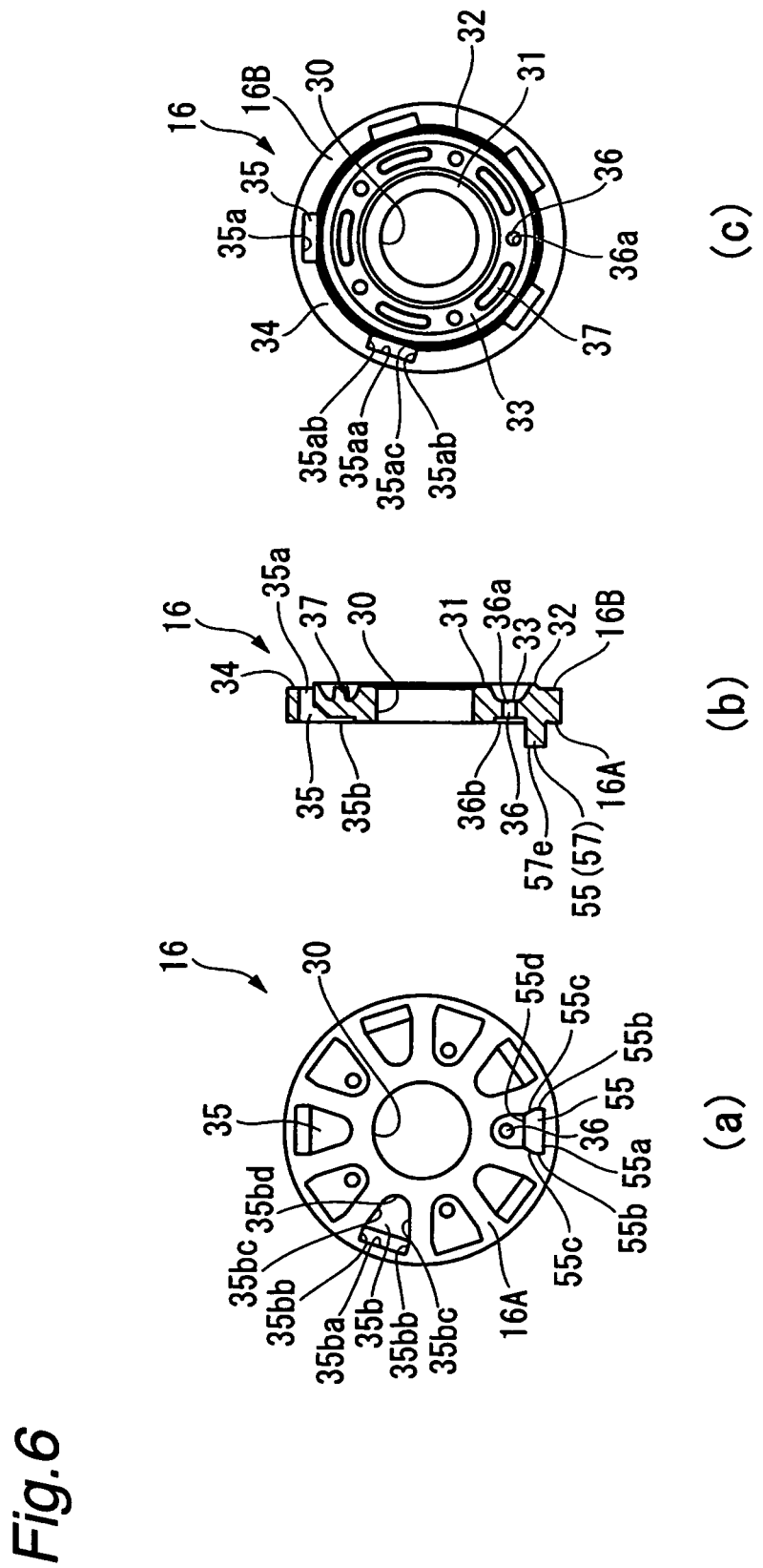
FIG. 6 illustrates a second piston body of the fluid pressure shock absorber according to the second embodiment of the present invention, and in particular.

As shown in FIGS. 4 and 5, the concave portion 26 in the first embodiment is not provided at the first piston body 15 in the fluid pressure shock absorber 11 of the second embodiment. Further, as shown in FIGS. 4 and 6, only one convex portion 55 used for positioning is formed on the radially outer side of the coupled surface 16A of the second piston body 16 relative to the second communication passages 36, not on the through-hole 30 side. The convex portion 55 is formed so as to be circumferentially aligned with the second communication passage 36.

More specifically, the convex portion 55 includes a circumferentially extending plane portion 55a located on the radially outer end side of the second piston 16 in the convex portion 55. The convex portion 55 further includes a pair of plane portions 55b extending in parallel with each other from the respective circumferential ends of the plane portion 55a toward the center side of the second piston body 16. The convex portion 55 further includes a pair of inclined plane portions 55c, each of the inclined plane portions extending from the opposite side of the respective plane portion 55b from the plane portion 55a so as to be inclined to be closer to each other on the center side of the second piston body 16. The convex portion 55 further includes a plane portion 55d connecting the opposite sides of the inclined plane portions 55c from the plane portions 55b, and extending in parallel with the plane portion 55a. The convex portion 55a further includes a top plane portion 55e located on the axial top of the convex portion 55a.

In the second embodiment, when the first piston body 15 and the second piston body 16 are coupled with each other while the through-holes 17 and 30 are aligned with each other and the coupled surfaces 15A and 16A are in contact with each other, the convex portion 55 is substantially circumferentially tightly fitted into one of the plurality of the second communication passages 21. At this time, one of the pair of plane portions 55b of the convex portion 55 abuts against one of the pair of linear portions 21bb of the opening 21b of the second communication passage 21, and the other of the pair of plane portions 55b abuts against the other of the pair of linear portions 21bb. Due to this abutment, the first piston body 15 and the second piston body 16 are positionally fixed in the circumferential direction relative to each other, and their relative displacement in the circumferential direction is prevented. It should be noted that the convex portion 55 may be fitted into any of the openings 21b of the second communication passages 21 so that the first piston body 15 and the second piston body 16 are positionally fixed in the circumferential direction relative to each other, and their relative displacement in the circumferential direction is prevented, as in the first embodiment. While the first piston 15 and the second piston 16 are coupled in this way, the respective first communication passages 20 are one-on-one aligned and communicate with their corresponding first communication passages 35 to form the first fluid passages 40, and the respective second communication passages 21 are one-on-one aligned and communicate with their corresponding second communication passages 36 to form the second fluid passages 41. In this way, in the second embodiment, the convex portion 55 and the second communication passage 21 constitute an engagement portion (rotation preventing unit) 57 for circumferential positioning of the first piston body 15 and the second piston body 16 and preventing relative rotation of the first piston body 15 and the second piston body 16.

According to the second embodiment configured as mentioned above, since the communication passage 21 can be used as a concave portion constituting the engagement portion 57, it is not required to prepare a concave portion separately.

Having described the second embodiment in detail, now advantageous effects of the second embodiment will be described.

The second communication passage 21 can be used as a concave portion of the engagement portion 57 for positioning of the first piston body 15 and the second piston body 16 at a predetermined circumferential positional relationship and prevention of relative rotation of the first piston body 15 and the second piston body 16. Therefore, it is not required to prepare a concave portion separately.

Further, the first piston body 15 and the second piston body 16 are circumferentially positionally fixed by engagement of the convex portion 55 of one of the piston bodies (i.e., the second piston body 16) with the second communication passage 21 of the other of the piston bodies (i.e., the first piston body 15). Therefore, a large flow passage cross-sectional area can be secured, and therefore the obtained damping force characteristics can have a wide range.

Third Embodiment

Hereinafter, a fluid pressure shock absorber according to a third embodiment of the present invention will be described with reference to FIGS. 7 and 8. In particular, difference from the first embodiment will be explained in detail. In the following description, like components are denoted by like reference numerals as of the first embodiment.

Figure 7:
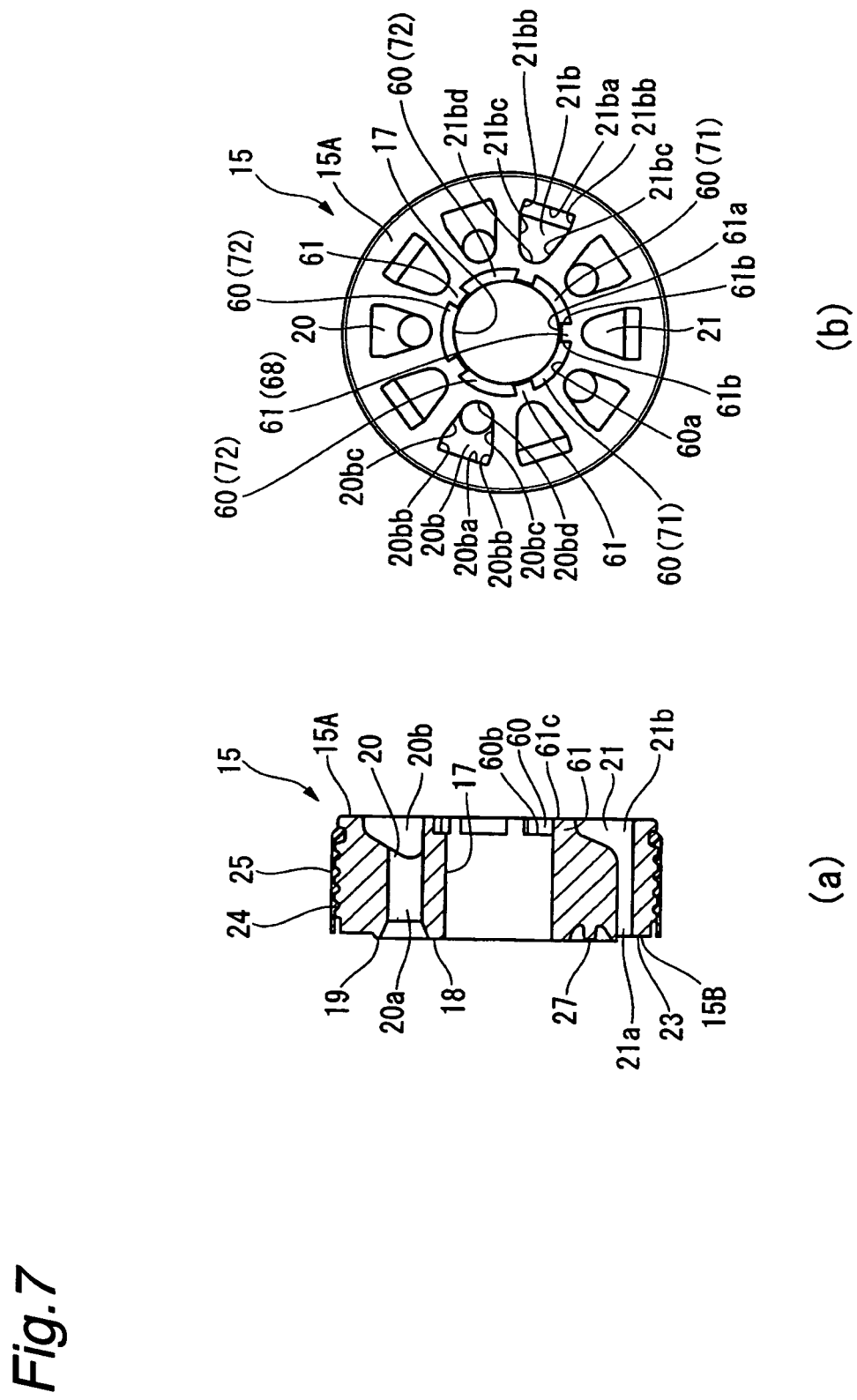
FIG. 7 illustrates a first piston body of the fluid pressure shock absorber according to a third embodiment of the present invention, and in particular.
Figure 8:
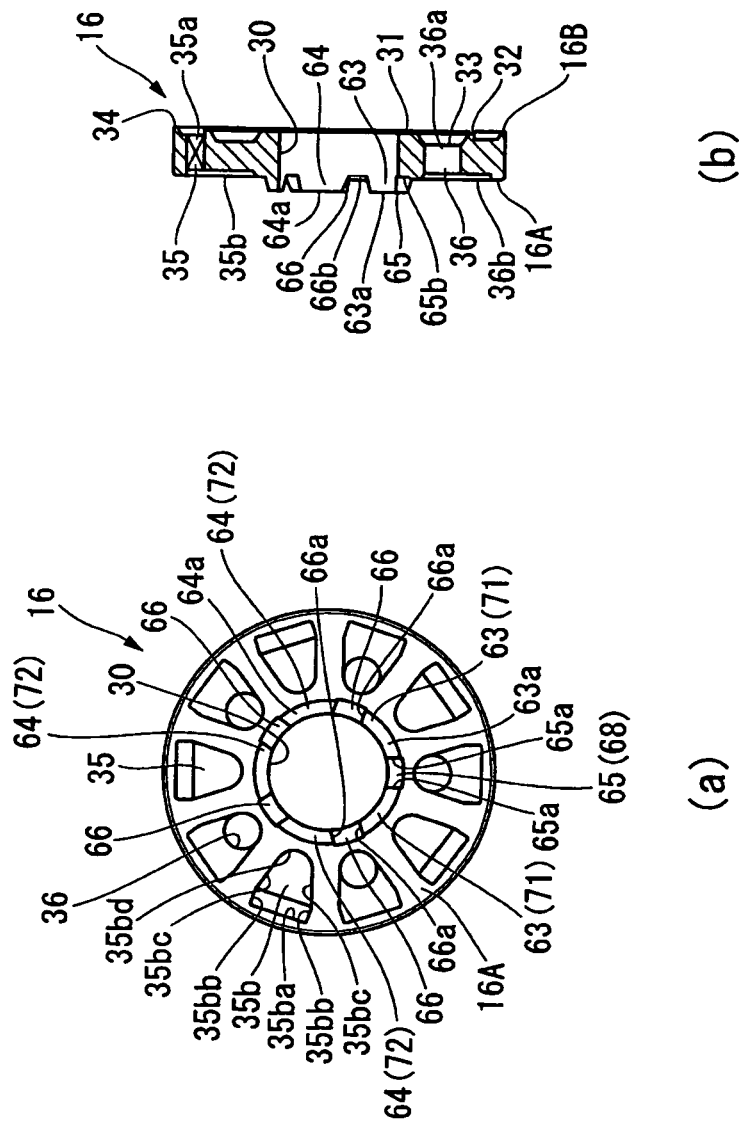
FIG. 8 illustrates a second piston body of the fluid pressure shock absorber according to the third embodiment of the present invention, and in particular.

FIG. 7 illustrates the first piston body of the fluid pressure shock absorber according to the third embodiment of the present invention. In particular, FIG. 7(a) and FIG. 7(b) are a sectional side view and a back view, respectively. FIG. 8 illustrates the second piston body of the fluid pressure shock absorber according to the third embodiment of the present invention. In particular, FIG. 8(a) and FIG. 8(b) are a front view and a sectional side view, respectively.

In the third embodiment, a plurality of axially concaved concave portions 60 (in the third embodiment, five concave portions) are formed on the through-hole 17 side of the coupled surface 15A of the axially long first piston body 15 for circumferential positioning of the piston bodies 15 and 16 when the piston bodies 15 and 16 are coupled with each other. The concave portions 60 are formed so as to be aligned with the first communication passages 20 in the circumferential direction. All of the concave portions 60 have a same shape, and each have a substantially arcuate shape in cross section perpendicular to the axis. The concave portions 60 are located radially inside the first communication passages 20 and the second communication passages 21 in the first piston body 15. Due to provision of the concave portions 60 in this way, convex portions 61 are formed in a radially inwardly protruding manner on the coupled surface 15A side of the first piston body 15. The convex portions 61 are formed between the circumferentially adjacent concave portions 60 so as to be aligned with the second communication passages 21 in the circumferential direction.

The convex portion 61 has a substantially rectangular shape in cross section perpendicular to the axis. More specifically, the convex portion 61 includes a curved surface portion 61a extending from the inner circumferential surface of the through-hole 17, a pair of plane portions 61b extending in parallel with each other from the respective ends of the curved surface portion 61a to the outer circumferential side of the first piston body 15, and a top plane portion 61c which is a part of the coupled surface 15A.

The concave portion 60 concaved from the coupled surface 15A and the through-hole 17 includes the above mentioned plane portions 61b which are in a circumferentially opposing relationship. The concave portion 60 further includes a curved surface portion 60a connecting the ends of the plane portions 61b on the opposite side from the through hole 17, and extending coaxially with the through-hole 17. The concave portion 60 further includes a plane portion 60b connecting the ends of the plane portions 61b on the opposite side from the coupled surface 15A and extending from the end of the curved surface portion 60a, and extending in parallel with the coupled surface 15A.

Two convex portions 63 and a plurality of convex portions 64 (in the third embodiment, three convex portions 64) are formed on the through-hole 30 side of the coupled surface 16A of the second piston 16. The two convex portions 63 are formed in an axially protruding manner from the coupled surface 16A and are located in a circumferentially adjacent relationship with each other. The convex portions 64 are formed in an axially protruding manner from the coupled surface 16A. The convex portions 63 and 64 are located so as to be radially aligned with the first communication passages 35. A concave portion 65 is formed between the circumferentially adjacent two convex portions 63 so as to be aligned with the second communication passage 36 in the circumferential direction. The concave portion 65 is used for positioning of the first and second piston bodies 15 and 16, and adapted to substantially circumferentially tight-fittedly receive one of the convex portions 61 when the piston bodies 15 and 16 are coupled with each other. A plurality of concave portions 66 (in the third embodiment, four concave portions 66) are formed between the circumferentially adjacent convex portions 64 or between the convex portions 63 and 64 so as to be aligned with the second communication passages 36 in the circumferential direction. The concave portions 66 are respectively fitted onto the convex portions 61 with spaces therebetween in the circumferential direction. The concave portion 65 has a substantially rectangular shape in cross section perpendicular to the axis, and any of the convex portions 61 can be substantially circumferentially tightly fitted into the concave portion 65.

More specifically, the concave portion 65 includes a pair of plane portions 65a extending from the through-hole 30 toward the outer circumferential side of the piston body 16, and a bottom surface portion 65b connecting the coupled surface 16A sides of the plane portions 65a and extending in parallel with the coupled surface 16A.

Similarly, the concave portion 66 has a substantially rectangular shape in cross section perpendicular to the axis. More specifically, the concave portion 66 includes a pair of plane portions 66a extending from the through-hole 30 toward the outer circumferential side of the second piston body 16, and a bottom surface portion 66b connecting the coupled surface 16A sides of the plane portions 66a and extending in parallel with the coupled surface 16A. It should be noted that the distance between the pair of plane portions 66a is longer than that between the pair of plane portions 65a.

The convex portion 63 includes the above mentioned plane portion 65a and plane portion 66a which are in a circumferentially adjacent and opposing relationship with each other, and a plane portion 63a which is a top of the protrusion and extends in parallel with the coupled surface 16A.

The convex portion 64 includes two of the above mentioned plane portions 66a which are in a circumferentially adjacent and opposing relationship with each other, and a plane portion 64a which is a top of the protrusion and extends in parallel with the coupled surface 16A.

In the third embodiment, when the first and second piston bodies 15 and 16 are coupled with each other while the through-holes 17 and 30 are aligned with each other and the coupled surfaces 15A and 16A are in contact with each other; one of the convex portions 61 of the first piston body 15 is substantially circumferentially tightly fitted into the concave portion 65 of the second piston body 16 (that is, tight fitting), and the rest of the convex portions 61 are one-on-one inserted into the corresponding concave portions 66 with spaces therebetween in the circumferential direction (that is, loose fitting). At this time, one of the pair of plane portions 61b of the convex portion 61 abuts against one of the pair of plane portions 65a of the concave portion 65, and the other of the pair of plane portions 61b of the convex portion 61 abuts against the other of the pair of plane portions 65a of the concave portion 65.

In other words, when the first and second piston bodies 15 and 16 are coupled with each other while the through-holes 17 and 30 are aligned with each other and the coupled surfaces 15A and 16A are in contact with each other; the two convex portions 63 adjacent to the concave portion 65 of the second piston body 16 are fitted into the two concave portions 60 adjacent to the convex portion 61 of the first piston body 15. At this time, ones of the two pairs of circumferentially adjacent and opposing plane portions 65a of the two convex portions 63 respectively abut against ones of the two pairs of circumferentially adjacent and opposing plane portions 61b of the two concave portions 60 without spaces therebetween in the circumferential direction. Similarly, the others of the two pairs of plane portions 65a respectively abut against the others of the two pairs of plane portions 61b without spaces therebetween in the circumferential direction. The respective convex portions 64 are inserted into the corresponding concave portions 60 with spaces therebetween in the circumferential direction.

Due to these abutments, the first piston body 15 and the second piston body 16 are positionally fixed relative to each other in the circumferential direction, and circumferential relative displacement therebetween is prevented. Any one of the convex portions 61 of the first piston body 15 may be fitted into the concave portion 65 of the second piston body 16, i.e., the two convex portions 63 adjacent to the concave portion 65 of the first piston body 15 may be fitted into any two of the concave portions 60; so that the first piston body 15 and the second piston body 16 are positionally fixed relative to each other in the circumferential direction, and circumferential relative displacement therebetween is prevented. Then, as in the first embodiment, the respective first communication passages 20 are one-on-one aligned and communicate with the corresponding first communication passages 35 to form the first fluid passages 40, and the respective second communication passages 21 are one-on-one aligned and communicate with the corresponding second communication passages 36 to form the second fluid passages 41.

In the third embodiment, any one of the convex portions 61 of the first piston body 15 is substantially circumferentially tightly fitted into the concave portion 65 of the second piston body 16, which constitutes an engagement portion 68 for circumferential positioning of the first and second piston bodies 15 and 16, and prevention of circumferential relative displacement between the first and second piston bodies 15 and 16.

In other words, the two adjacent convex portions 63 of the second piston body 16 and any adjacent two of the concave portions 60 of the first piston body 15 constitute an engagement portion 71 for circumferential positioning of the first and second piston bodies 15 and 16, and prevention of circumferential relative displacement between the first and second piston bodies 15 and 16. In addition, the convex portions 64 of the second piston body 16 and the rest of the concave portions 60 of the first piston body 15 constitute engagement portions 72 for prevention of circumferential relative displacement between the first and second piston bodies 15 and 16.

In the second piston body 16, the heights of the two convex portions 63 are the same as the heights of the three convex portions 64, i.e., the axial positions of the plane portions 63a are the same as the axial positions of the plane portions 64a. As a result, since the second piston body 16 includes the two convex portions 63 and the three convex portions 64, the second piston body 16 does not tilt or fall, with the coupled surface 16A side including the convex portions 63 and 64 down. It is preferable that the second piston body 16 includes three or more protruding convex portions for preventing the second piston body 16 from tilting or falling.

For disposing and fixing the piston bodies around the piston rod without use of the press-fitting method, it is required to prevent circumferential rotation of the piston bodies so as to keep the communication passages aligned. As another conventional art, there is an invention disclosed in Japanese Published Examined Application No. Shou 48-21378 (Conventional Art 4). Conventional Art 4 includes an engagement portion constituted by a pin and a hole engaged with each other to prevent circumferential rotation. However, in Conventional Art 4, only one engagement portion is provided. Therefore, for example, when components are supplied to be assembled with use of a parts feeder, a component having only one convex portion lacks stability and tends to lose balance, whereby the supply performance can be deteriorated. One solution to this problem is providing a plurality of engagement portions to a component. However, if a plurality of engagement portions are provided to a component, it becomes difficult to couple components with each other because of tolerance if all convex portions and all concave portions are supposed to have a substantially "tight-fitting" relationship.

On the other hand, in the third embodiment, since the second piston body 16 includes the convex portions 63 and the convex portions 64, the second piston body 16 does not tilt or fall, with the coupled surface 16A side including the convex portions 63 and 64 down. Therefore, for example, even when components are supplied to be assembled with use of a parts feeder, the components keep stability and balance, whereby the supply performance of the parts feeder can be improved.

Since the second piston body 16 includes three or more convex portions 63 and 64, it cannot tilt or fall despite its simple structure.

Further, in at least one of engaging portions, i.e., the engagement portion 71, the convex portion is substantially tightly fitted into the concave portion, and in the rest of the engagement portions, i.e., the engagement portions 72, the convex portions are inserted into the concave portion with some spaces around the convex portions. Therefore, coupling of the first piston body 15 and the second piston body 16 can be easily achieved.

Having described the third embodiment in detail, now advantageous effects of the third embodiment will be described.

In the third embodiment, the second piston body 16 includes the axially outwardly protruding convex portions 63 and 64. The plane portions 63*a* and 64*a*, which are end surfaces of the convex portions 63 and 64, have a same axial position, whereby the second piston body cannot tilt or fall, with the coupled surface 16A including the convex portions 63 and 64 down. Therefore, for example, even when components are supplied to be assembled with use of a parts feeder, the components keep stability and balance with the convex portions 63 and 64 side down, whereby the supply performance of the parts feeder can be improved.

Further, since the two convex portions 63 and the three convex portions 64, i.e., a total of five convex portions are circumferentially substantially-equiangular formed, whereby tilt or fall of the piston body 16 can be prevented with a simple structure.

Furthermore, in the third embodiment, the one engagement portion 71 is constituted by the two convex portions 63 and the two concave portions 60, and the convex portions 63 are substantially circumferentially tightly fitted into the concave portions 60, respectively. The three engagement portions 72 are constituted by the convex portions 64 and the concave portions 60, and the convex portions 64 are respectively inserted into the concave portions with spaces therebetween in the circumferential direction. Therefore, coupling of the first piston body 15 and the second piston body 16 can be easily achieved.

Fourth Embodiment

Figure 9:
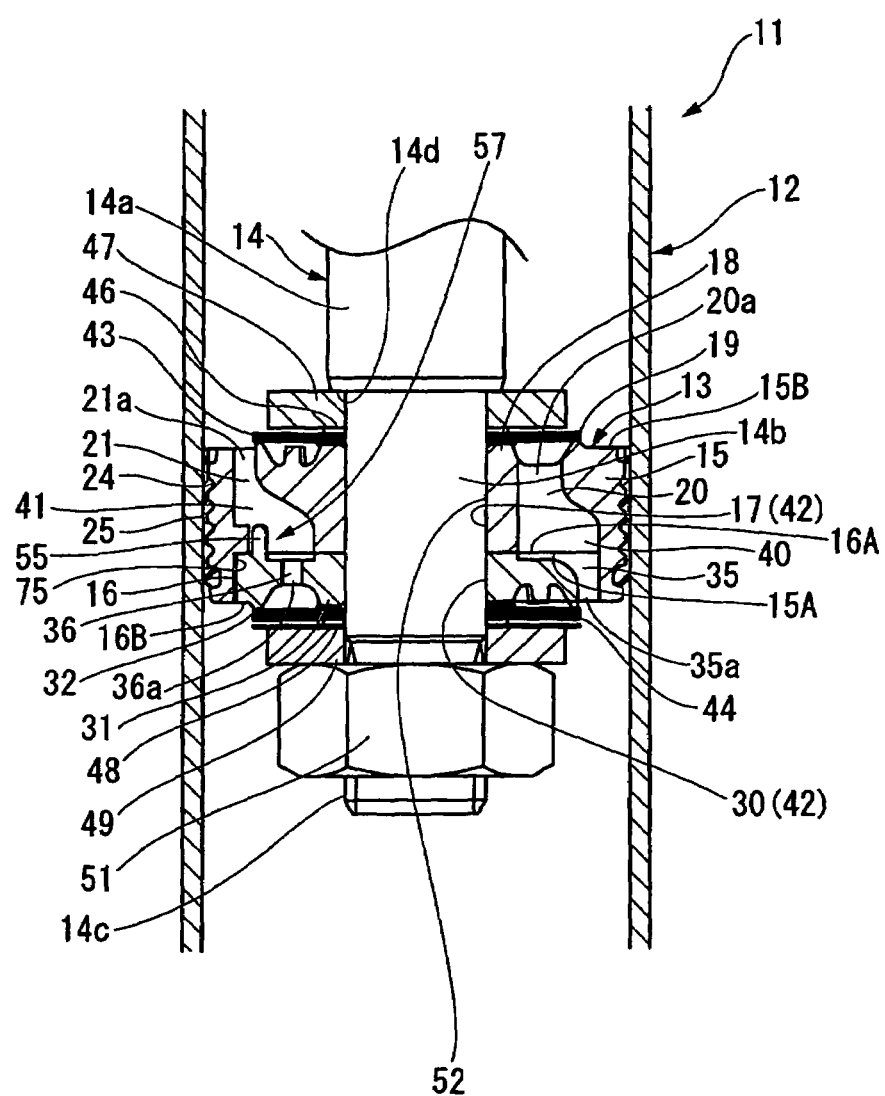
FIG. 9 is a partial cross sectional view illustrating a fluid pressure shock absorber according to a fourth embodiment of the present invention.

Hereinafter, a fluid pressure shock absorber according to a fourth embodiment of the present invention will be described with reference to FIG. 9. In particular, difference from the second embodiment will be explained in detail. In the following description, like components are denoted by like reference numerals as of the second embodiment.

In the fluid pressure shock absorber 11 according to the fourth embodiment, the first piston body 15 includes the attachment portion 24 having an outer circumferential surface extending to the second piston body 16 side. A fitted hole 75 is formed coaxially with the first piston body 15 so as to have a slightly smaller diameter than that of the attachment portion 24. The above-mentioned first communication passages 20 and the second communication passages 21 are opened at the bottom portion of the fitted hole 75. The second piston body 16 is fitted into the fitted hole 75 of the first piston body 15. As in the second embodiment, the protruding portion 55 of the second piston body 16 is engaged with the second communication passage 21 of the first piston body 15, whereby the first and second piston bodies 15 and 16 are positioned relative to each other in the circumferential direction. The difference between the fourth embodiment and Conventional Art 2 is that, in the fourth embodiment, the first piston body 15 and the second piston body 16 respectively contact the piston rod 14 along the whole axial lengths thereof. According to the fourth embodiment, the piston 13 can effectively receive a tightening axial force of the nut 51, whereby the nut 51 and the piston rod 14 can have small diameters.

According to the fourth embodiment configured as mentioned above, the second piston 16 is substantially overall fitted into the first piston body 15, and this leads to a reduction in the size of the piston 13.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority under 35 U.S.C. section 119 to Japanese Patent Application No. 2008-079590, filed on Mar. 26, 2008, and Japanese Patent Application No. 2008-274765, filed on Oct. 24, 2008. The entire disclosure of Japanese Patent Applications No. 2008-079590 and 2009-274765 including specification, claims, drawings and summary is incorporated herein by reference in its entirety.

Japanese Patent Application Public Disclosure No. 2005-188602, U.S. Pat. No. 5,259,294, Japanese Patent No. 3383865, and Japanese Published Examined Application No. Shou 48-21378 are incorporated herein by reference in their entirety.

What is claimed is:

1. A fluid pressure shock absorber comprising:
   a cylinder sealingly containing fluid;
   a piston slidably disposed in the cylinder; and
   a piston rod coupled with the piston, the piston rod having one end thereof extending to an outside of the cylinder, wherein
   the piston includes extension-side communication passages and compression-side communication passages, and has a first disk valve for generating damping forces by opening and closing one of the extension-side communication passages and the compression-side communication passages and a second disk valve for generating damping forces by opening and closing the other of the extension-side and compression-side communication passages;
   the piston includes a first piston body and a second piston body coupled to each other at coupled surfaces thereof, the coupled surfaces extend in a direction parallel to a radial direction of the piston rod, and the coupled surfaces of the first piston body and the second piston body contact each other or are opposed to each other;
   a first through-hole, which the piston rod penetrates through, is provided at the first piston body;

the extension-side and compression-side communication passages are provided at the first piston body;

a second through-hole, which the piston rod penetrates through, is provided at the second piston body;

the extension-side and/or the compression-side communication passages are provided at the second piston body;

an annular valve seat, which the second disk valve abuts against, is formed on a non-coupled surface of the second piston body, and the other of the extension-side and compression-side communication passages are in communication with an inner circumference of the annular valve seat;

a rotation preventing unit for preventing relative rotation of the piston bodies is provided on the coupled surfaces of the piston bodies, the rotation preventing unit being configured such that the extension-side communication passages of the first piston body are aligned with the extension-side communication passages of the second piston body and/or the compression-side communication passages of the first piston body are aligned with the compression-side communication passages of the second piston body;

the rotation preventing unit comprises, at one of the first and second piston bodies, a plurality of first recesses arranged in the circumferential direction of one of the first and second piston bodies and a plurality of first protrusions formed between the first recesses, and the rotation preventing unit further comprises, at the other of the first and second piston bodies, a plurality of second protrusions arranged in the circumferential direction of the other of the first and second piston bodies and a plurality of second recesses formed between the second protrusions;

the second protrusions and the first protrusions are fitted into the first recesses and the second recesses, respectively, without press-fitting, to prevent the relative rotation of the piston bodies;

the first recesses are recessed from the coupled surface of the one of the first and second piston bodies in an axial direction of the piston rod;

the second protrusions protrude from the coupled surface of the other of the first and second piston bodies in an axial direction of the piston rod;

the radially inner circumferences of the first recesses and the second protrusions are facing the through-holes of the piston bodies;

one of the first protrusions and the second protrusions is substantially circumferentially tightly fitted into the second recesses or the first recesses, the rest of the first protrusions and the second protrusions are inserted into the second recesses or the first recesses with spaces therebetween in the circumferential direction; and the first piston body, the second piston body, and the first and second disk valves are fixed to the piston rod, with the first protrusions being engaged with the second recesses and the second protrusions being engaged with the first recesses.

2. The fluid pressure shock absorber of claim 1, wherein the other of the first and second piston bodies having the second protrusions has a shape such that the other of the piston bodies cannot tilt or fall with the second protrusion side down.

3. The fluid pressure shock absorber of claim 2, wherein the plurality of second protrusions comprises three or more protrusions provided in the circumferential direction of the through-holes.

4. The fluid pressure shock absorber of claim 1, wherein the first piston body is longer in axial length than the second piston body, and wherein a sliding member, which is slidable along the inner circumference of the cylinder, is disposed around the first piston body.

5. The fluid pressure shock absorber of claim 1, wherein opening ends of the communication passages on the inner circumferential side are circular holes, and opening ends of the communication passages on the outer circumferential side are rectangular holes elongated in the circumferential direction.

6. The fluid pressure shock absorber of claim 1, wherein the other annular valve seat, which the first disk valve abuts against, is formed on a non-coupled surface of the first piston body, and the other one of the extension-side and compression-side communication passages is in communication with the inner circumference of the other annular valve seat.

7. The fluid pressure shock absorber of claim 1, wherein an axial space is generated between the recess and the protrusion when the recess and the protrusions are engaged with each other while being fixed to the piston rod.

8. The fluid pressure shock absorber of claim 1, wherein the plurality of the protrusions and the plurality of the recesses are formed so that the phase of the extension-side and compression-side communication passages in the circumferential direction and the phase of the plurality of the protrusions and the plurality of the recesses are aligned with each other.

9. The fluid pressure shock absorber of claim 1, wherein, in at least one of the first and second piston bodies, the recesses have a pair of plane portions arranged in the circumferential direction and formed such that a circumferential distance between the plane portions increases from a bottom surface of the respective recess toward the coupled surface of the respective piston body.

10. A fluid pressure shock absorber comprising:
a cylinder sealingly containing fluid;
a piston slidably disposed in the cylinder; and
a piston rod coupled to the piston, the piston rod having one end thereof extending to an outside of the cylinder, wherein the piston comprises a first piston body and a second piston body coupled to each other at coupled surfaces thereof, the coupled surfaces extend in a direction parallel to a radial direction of the piston rod, and the coupled surfaces of the first piston body and the second piston body contact each other or are opposed to each other;

extension-side communication passages and compression-side communication passages are provided at each of the piston bodies;

a first through-hole, which the piston rod penetrates through, is provided at the first piston body;

a first annular valve seat is formed on a non-coupled surface of the first piston body, the extension-side communication passages being disposed on an outer circumferential side relative to the first annular valve seat, the compression-side communication passages being in communication with an inner circumferential side relative to the first annular valve seat;

a second through-hole, which the piston rod penetrates through, is provided at the second piston body;

a second annular valve seat is formed on a non-coupled surface of the second piston body, the compression-side communication passages being disposed at the outer circumferential side relative to the second annular valve seat, the extension-side communication passages being in communication with the inner circumferential side relative to the second annular valve seat;
a first disk valve and a second disk valve which abut against the respective valve seats for generating damping forces, are disposed on the non-coupled surfaces of the first and second piston bodies, respectively;
a sliding member, which is slidable along the inner circumference of the cylinder, is disposed around one of the piston bodies;
a rotation preventing unit for preventing relative rotation of the piston bodies is provided on the coupled surfaces of the piston bodies, the rotation preventing unit being configured such that the extension-side communication passages of the first piston body are aligned with the extension-side communication passages of the second piston body and/or the compression-side communication passages of the first piston body are aligned with the compression-side communication passages of the second piston body;
the rotation preventing unit comprises, at one of the first and second piston bodies, a plurality of first recesses formed in the circumferential direction of the one of the first and second piston bodies and a plurality of first protrusions formed between the first recesses and, at the other of the first and second piston bodies, a plurality of second protrusions and a plurality of second recesses formed in the circumferential direction;
the second protrusions are inserted into the first recesses, and the first protrusions are inserted into the second recesses, without press-fitting, so that the rotation preventing unit prevents the relative rotation of the first and second piston bodies;
the first recesses are recessed from the coupled surface of the one of the first and second piston bodies in an axial direction of the piston rod;
the second protrusions protrude from the coupled surface of the other of the first and second piston bodies in an axial direction of the piston rod;
the radially inner circumferences of the first recesses and the second protrusions are facing the through-holes of the piston bodies;
one of the first protrusions and the second protrusions is substantially circumferentially tightly fitted into the second recesses or the first recesses, the rest of the first protrusions and the second protrusions are inserted into the second recesses or the first recesses with spaces therebetween in the circumferential direction; and
the first piston body, the second piston body, the first disk valve, and the second disk valve are fixed to the piston rod, with the recesses and the protrusions engaged with each other.

11. The fluid pressure shock absorber of claim 10, wherein the plurality of the protrusions and the plurality of the recesses are formed so that the phase of the extension-side and the compression-side communication passages in the circumferential direction and the phase of the plurality of the protrusions and the plurality of recesses are aligned with each other.

12. The fluid pressure shock absorber of claim 10, wherein, in at least one of the first and second piston bodies, the recesses have a pair of plane portions arranged in the circumferential direction and formed such that a circumferential distance between the plane portions increases from a bottom surface of the respective recess toward the coupled surface of the respective piston body.

13. A fluid pressure shock absorber comprising:
a cylinder sealingly containing fluid;
a piston slidably disposed in the cylinder;
a piston rod coupled to the piston, the piston rod having one end thereof extending to an outside of the cylinder, wherein
the piston includes extension-side communication passages and compression-side communication passages, and comprises a first disk valve for generating damping forces by opening and closing one of the extension-side communication passages and the compression-side communication passages and a second disk valve for generating damping forces by opening and closing the other of the extension-side communication passages and the compression-side communication passages;
the piston includes a first piston body and a second piston body coupled to each other at coupled surfaces thereof, the coupled surfaces extend in a direction parallel to a radial direction of the piston rod, and the coupled surfaces of the first piston body and the second piston body contact each other or are opposed to each other;
a first through-hole, which the piston rod penetrates through, is provided at the first piston body;
the extension-side and the compression-side communication passages are provided at the first piston body;
a second through-hole, which the piston rod penetrates through, is provided at the second piston body,
the extension-side communication passages and/or the compression-side communication passages are provided at the second piston body;
a rotation preventing unit for preventing relative rotation of the first piston body and the second piston body is provided between the piston bodies, the rotation preventing unit being configured such that the extension-side communication passages of the first piston body are aligned with the extension-side communication passages of the second piston body and/or the compression-side communication passages of the first piston body are aligned with the compression-side communication passages of the second piston body;
the rotation preventing unit comprising a plurality of first recesses axially recessed from the coupled surface of the one of the first and second piston bodies and circumferentially arranged and a plurality of first protrusions between the first recesses, and a plurality of second protrusions axially protruding from the coupled surface of the other of the first and second piston bodies and circumferentially arranged and a plurality of second recesses between the second protrusions, wherein the second protrusions and the first protrusions are respectively inserted into the first recesses and the second recesses, without press-fitting, to prevent relative rotation of the other of the first and second piston bodies;
the radially inner circumferences of the first recesses and the second protrusions are facing the through-holes of the piston bodies;
one of the first protrusions and the second protrusions is substantially circumferentially tightly fitted into the second recesses or the first recesses, the rest of the first protrusions and the second protrusions are inserted into the second recesses or the first recesses with spaces therebetween in the circumferential direction; and
the first piston body and the second piston body are fixed to the piston rod with the first protrusions being engaged with the second recesses and the second protrusions being engaged with the first recesses.

14. The fluid pressure shock absorber of claim 13, wherein a first valve seat, which the first disk valve abuts against, is formed on a non-coupled surface of the first piston body, the first valve seat surrounding one of the extension-side and compression-side communication passages, and
wherein a second annular valve seat, which the second disk valve abuts against, is formed on a non-coupled surface of the second piston body, the second annular valve seat surrounding the other of the extension-side and compression-side communication passages.

15. The fluid pressure shock absorber of claim 13, wherein the second protrusion comprises three or more protrusions axially protruding from the coupled surface, and
one of the first and second piston bodies including the second protrusions is shaped in such a manner that the three protrusions are arranged in the circumferential direction and has a shape such that the one of the piston bodies cannot tilt or fall with the second protrusion side down.

16. The fluid pressure shock absorber of claim 13, wherein the plurality of the protrusions and the plurality of the recesses are formed so that the phase of the extension-side and the compression-side communication passages in the circumferential direction and the phase of the plurality of the protrusions and the plurality of recesses are aligned with each other.

17. The fluid pressure shock absorber of claim 13, wherein, in at least one of the first and second piston bodies, the recesses have a pair of plane portions arranged in the circumferential direction and formed such that a circumferential distance between the plane portions increases from a bottom surface of the respective recess toward the coupled surface of the respective piston body.

18. A fluid pressure shock absorber comprising:
a cylinder sealingly containing fluid;
a piston slidably disposed in the cylinder;
a piston rod coupled to the piston, the piston rod having one end thereof extending to an outside of the cylinder, wherein
the piston includes extension-side communication passages and compression-side communication passages, and comprises a first disk valve for generating damping forces by opening and closing one of the extension-side communication passages and the compression-side communication passages and a second disk valve for generating damping forces by opening and closing the other of the extension-side communication passages and the compression-side communication passages;
the piston includes a first piston body and a second piston body coupled to each other at coupled surfaces thereof, the coupled surfaces extend in a direction parallel to a radial direction of the piston rod, and the coupled surfaces of the first piston body and the second piston body contact each other or are opposed to each other;
a first through-hole, which the piston rod penetrates through, is provided at the first piston body;
the extension-side and the compression-side communication passages are provided at the first piston body;
a second through-hole, which the piston rod penetrates through, is provided at the second piston body;
the extension-side communication passages and/or the compression-side communication passages are provided at the second piston body;
a rotation preventing unit for preventing relative rotation of the first piston body and the second piston body is provided between the piston bodies, the rotation preventing unit being configured such that the extension-side communication passages of the first piston body are aligned with the extension-side communication passages of the second piston body and/or the compression-side communication passages of the first piston body are aligned with the compression-side communication passages of the second piston body;
the rotation preventing unit comprises a plurality of first recesses axially recessed from the coupled surface of the one of the first and second piston bodies and circumferentially arranged and a plurality of first protrusions between the first recesses, and a plurality of second protrusions axially protruding from the coupled surface of the other of the first and second piston bodies and circumferentially arranged and a plurality of second recesses between the second protrusions, wherein the second protrusions and the first protrusions are respectively inserted into the first recesses and the second recesses without press-fitting, to prevent relative rotation of the first and second piston bodies;
in at least one of the first and second piston bodies, the recesses have a pair of plane portions arranged circumferentially and formed such that a circumferential distance between the plane portions increases from a bottom surface of the respective recess toward the coupled surface of the respective piston body; and
the first piston body and the second piston body are fixed to the piston rod, with the recess and the protrusion engaged with each other.

19. The fluid pressure shock absorber of claim 18, wherein the plurality of the protrusions and the plurality of the recesses are formed so that the phase of the extension-side and the compression-side communication passages in the circumferential direction and the phase of the plurality of the protrusions and the plurality of recesses are aligned with each other.

20. The fluid pressure shock absorber of claim 18, wherein one of the first and second protrusions is substantially tightly fitted into the second and first recess in the circumferential direction, and in the rest of the first and second protrusions are inserted into the second and first recesses with some spaces in the circumferential direction between the protrusions and the respective recesses.

21. The fluid pressure shock absorber of claim 18, wherein the radially inner circumferences of the first recesses and the second protrusions are facing the through-holes of the piston bodies.

* * * * *